(12) United States Patent
Miyamoto

(10) Patent No.: US 7,024,219 B2
(45) Date of Patent: Apr. 4, 2006

(54) TRANSMISSION POWER CONTROL APPARATUS AND METHOD IN A WIRELESS COMMUNICATION SYSTEM

(75) Inventor: Shoichi Miyamoto, Kawasaki (JP)

(73) Assignee: Fujitsu Limited, Kawasaki (JP)

(\*) Notice: Subject to any disclaimer, the term of this patent is extended or adjusted under 35 U.S.C. 154(b) by 0 days.

(21) Appl. No.: 11/030,399

(22) Filed: Jan. 6, 2005

(65) Prior Publication Data

US 2005/0130689 A1 Jun. 16, 2005

Related U.S. Application Data

(63) Continuation of application No. PCT/JP02/10208, filed on Oct. 1, 2002.

(51) Int. Cl.
*H04Q 7/20* (2006.01)
(52) U.S. Cl. .................. 455/522; 455/69; 455/127.1; 370/318
(58) Field of Classification Search ............ 455/522, 455/69, 68, 127.1; 370/331, 318, 342; 375/317, 375/316, 326
See application file for complete search history.

(56) References Cited

U.S. PATENT DOCUMENTS

| | | | |
|---|---|---|---|
| 5,727,033 A | | 3/1998 | Weaver et al. |
| 6,463,044 B1 * | | 10/2002 | Seo .......................... 370/329 |
| 6,763,244 B1 * | | 7/2004 | Chen et al. ............... 455/522 |
| 2002/0165004 A1 * | | 11/2002 | Chen et al. ............... 455/522 |

FOREIGN PATENT DOCUMENTS

| | | |
|---|---|---|
| JP | 08-237220 | 6/1996 |
| JP | 08-181653 | 7/1996 |
| JP | 11-313028 | 11/1999 |
| JP | 2001-292098 | 8/2001 |

OTHER PUBLICATIONS

K. Higuchi, et al. Experiments on Adaptive Transmit Power Control Using Outer Loop for W-CDMA Mobile Radio. Technical Report of IEICE Apr. 1998 with full translation.
International Search Report dated Jan. 21, 2003.

\* cited by examiner

*Primary Examiner*—Tilahun Gesesse
(74) *Attorney, Agent, or Firm*—Katten Muchin Rosenman LLP

(57) ABSTRACT

In a mobile communication system 100 of the third generation CDMA type. A base station control apparatus 1 controls a transmission power of an opponent communication apparatus by means of measuring a FER within a predetermined segment, averaging plural pieces of quality information per frame, producing a translation table 40c by means of associating the FER acquired by the measurement and average frame quality information acquired by the averaging, estimating an estimated FER corresponding to the quality information per frame from the translation table 40c, and controlling a target receive power threshold based on the estimated FER and a target FER stored in advance, thereby quickly carrying out the transmission power control, improving the data quality of a lower layer, maintaining the data quality as constant, and increasing the throughput.

12 Claims, 18 Drawing Sheets

FIG. 9

| FER MEASURING SEGMENT USED FOR MEASUREMENT | AVERAGE SERav [NUMBER] | FERrel [%] |
|---|---|---|
| FER MEASURING SEGMENT 1 | 10 | 1.0 |
| FER MEASURING SEGMENT 2 | 40 | 2.0 |
| FER MEASURING SEGMENT 3 | 20 | 1.0 |
| FER MEASURING SEGMENT 4 | 30 | 0.5 |
| FER MEASURING SEGMENT 5 | 10 | 1.0 |
| FER MEASURING SEGMENT 6 | 50 | 2.0 |
| FER MEASURING SEGMENT 7 | 5 | 1.5 |
| FER MEASURING SEGMENT 8 | 80 | 0.5 |
| FER MEASURING SEGMENT 9 | 10 | 2.0 |
| FER MEASURING SEGMENT 10 | 5 | 1.5 |
| FER MEASURING SEGMENT 11 | 5 | 1.0 |
| FER MEASURING SEGMENT 12 | 25 | 1.0 |
| FER MEASURING SEGMENT 13 | 25 | 1.5 |
| FER MEASURING SEGMENT 14 | 30 | 2.0 |
| FER MEASURING SEGMENT 15 | 15 | 1.0 |
| FER MEASURING SEGMENT 16 | 15 | 1.0 |
| FER MEASURING SEGMENT 17 | 35 | 2.5 |
| FER MEASURING SEGMENT 18 | 40 | 2.0 |
| FER MEASURING SEGMENT 19 | 15 | 1.0 |
| FER MEASURING SEGMENT 20 | 20 | 1.0 |
| FER MEASURING SEGMENT 21 | 15 | 1.0 |
| ... | ... | ... |
| FER MEASURING SEGMENT 98 | 30 | 0.5 |
| FER MEASURING SEGMENT 99 | 20 | 1.0 |
| FER MEASURING SEGMENT 100 | 25 | 2.0 |

FIG. 10

| X FERrel [%] | Y FER MEASURING SEGMENT IDENTIFICATION FROM WHICH X IS ACQUIRED | Z AVERAGE SERav [NUMBER] FOR FER MEASURING SEGMENT CONTAINED IN Y |
|---|---|---|
| 0.5 | 4, 8, 98 | 30, 80, ..., 30 |
| 1.0 | 1, 3, 5, 11, 12, 15, 16, 19, 20, 21, ..., 99 | 10, 20, 10, 5, 25, 15, 15, 15, 20, 15, ..., 20 |
| 1.5 | 7, 10, 13 | 5, 5, 25 |
| 2.0 | 2, 6, 9, 14, 18, ..., 100 | 40, 50, 10, 30, 40, ..., 25 |
| 2.5 | 17 | 35 |

FIG. 19(a)

| Eb/N0 (dB) | SER AVERAGE VALUE (MEASURED VALUE) | STANDARD DEVIATION σ (NO UNIT) | SER VALUE (NO UNIT) | FER MEASURED VALUE (NO UNIT) |
|---|---|---|---|---|
| 5.61 | 1.40590D-01 | 6.05875D-02 | 1.26495D-01 | 2.67700D-02 |
| 6.67 | 1.14180D-01 | 5.63320D-02 | 1.01075D-01 | 7.45000D-03 |
| 7.14 | 8.75100D-02 | 5.13238D-02 | 7.55701D-02 | 2.48000D-03 |
| 8.54 | 6.30500D-02 | 4.57603D-02 | 5.24044D-02 | 4.50000D-04 |

NUMBER OF TIMES FOR AVERAGING: 50, RELIABILITY 95.0%

FIG. 19(b)

| Eb/N0 (dB) | SYMBOL ERROR NUMBER (NUMBER/ONE FRAME) | STANDARD DEVIATION σ (NO UNIT) | SER VALUE (NO UNIT) | FER MEASURED VALUE (NO UNIT) |
|---|---|---|---|---|
| 5.61 | 107.973 | 46.5312 | 1.26495D-01 | 2.67700D-02 |
| 6.67 | 87.6902 | 43.263 | 1.01075D-01 | 7.45000D-03 |
| 7.14 | 67.2077 | 39.4167 | 7.55701D-02 | 2.48000D-03 |
| 8.54 | 48.4224 | 35.1439 | 5.24044D-02 | 4.50000D-04 |

NUMBER OF TIMES FOR AVERAGING: 50, RELIABILITY 95.0%

TRANSMISSION POWER CONTROL APPARATUS AND METHOD IN A WIRELESS COMMUNICATION SYSTEM

CROSS-REFERENCE TO RELATED APPLICATION

This application is a continuation of an International Application No. PCT/JP02/10208 which was filed on Oct. 1, 2002, which is herein incorporated by reference.

TECHNICAL FIELD

The present invention relates to power control for a signal transmitted through a wireless communication path between a mobile station and a base station, and more particularly relates to a transmission power control apparatus, a mobile communication system, and a power control method preferable for power control which can optimally and quickly adjust a receive power target value serving as a reference of a transmission power in a Code Division Multiple Access (referred to as CDMA hereinafter) mobile communication system.

BACKGROUND ART

As a recent progress in mobile communication technology, 3G (3rd Generation: third generation mobile phones) standards have been studied by the 3GPP/3GPP2 (3rd Generation Partnership Project), which is organized by carries from various countries centered around the International Telecommunication Union (ITU). The 3G standards have been studied as IMT-2000 (International Mobile Telecommunication-2000), support transmission of various data such as audio, texts, still pictures, and motion pictures, which require different transmission rates, provide high speed transmission as well, and are intended for connection to the Internet and the like. There have already been released plural types of systems such as W-CDMA for Japan and Europe, and cdma2000 for the United States.

In these CDMA systems, respective channels of respective mobile station (also referred to as wireless terminal or subscriber terminal, referred to as MS hereinafter) and BTS (Base Transceiver Station, referred to as BTS hereinafter) are interfered by radio waves output by MS's and BTS's other than the MS and BTS itself, resulting in degradation of wireless line quality (simply referred to as quality hereinafter). This quality is also influenced by various factors such as the distance between the BTS and MS, the multipath environment, and the travel speed. Transmission power control (referred to as TPC hereinafter) is used to prevent the channel interference, to maintain the proper quality, and to increase the throughput of the overall system, thereby increasing the number of subscribers.

This TPC implies that the transmission powers of the MS itself and BTS itself are controlled to proper values based on control information (command) on the transmission powers contained in a frame transmitted from a BTS of opposite party (opponent BTS) and an MS of opposite party (opponent MS). Note that the opponent BTS and opponent MS are referred to as opponent apparatus (associated equipment) in the following description.

As the TPC, there is known inner loop control. The inner loop control implies control where the MS inserts TPC bits as the control information to an upstream slot, and the BTS then increases/decreases the transmission power values of the BTS and MS based on the TPC bits.

FIG. 20 describes the inner loop control and outer loop control. The inner loop control L1 shown in FIG. 20 controls the transmission powers of both the BTS and MS, and the BTS applies feedback control to the transmission power from the BTS itself, and the transmission power of a signal from the MS based on a receive power value of the signal transmitted by the MS. Namely, the BTS stores a receive power threshold value for the MS in advance, and transmits a command to the MS to increase the transmission power of the MS if the receive power value from the MS is lower than the receive power threshold value. Alternatively, the BTS transmits the TPC information to the MS to decrease the transmission power of the MS if the receive power value from the MS is higher than the receive power threshold. SIR (Signal Interference Ratio: SI ratio) is used as the receive power value, for example.

The description above is given of the inner loop control.

On the other hand, the outer loop control L2 shown in FIG. 20 is used for a base station controller (referred to as BSC hereinafter) to set the receive power threshold value of the inner loop control L1 by the BTS. The BSC estimates an average frame error rate (referred to as FER hereinafter, and also implies FER value unless otherwise specified) of the frames received by the BTS, and controls the receive power threshold value such that the FER remains at a desired value. As a result, proper TPC is provided according to changes in the transmission environment.

Note that open loop control is used for a mobile communication system to which the inner loop control cannot be applied such as a random access channel. The open loop control is carried out such that an MS estimates a transmission loss based on a receive power value of a signal transmitted by a BTS on the MS, thereby controlling the transmission power value of the MS itself.

A description will now be given of a calculation example of the FER of the outer loop control.

The target value of the quality depends on a service to be provided. For example, the FER for audio communication is 1.0%, and the FER for data communication is 0.1% or 0.2%. If a receiving section of the BTS or BSC processes the audio communication, the outer loop control is carried out such that the FER achieves 1.0%, and the FER is acquired using an equation (Z1).

$$FER = \text{(Number of frames of CRCNG or number of irregular frames such as corrupt frames)/Number of entire received frames} \quad (Z1)$$

The CRC (Cyclic Redundancy Check) is used to detect burst errors which occur in succession, and CRCNG (CRC No Good), which implies that a burst error is detected, or CRCOK (CRC O.K.), which implies that the number of errors is within a permissible range, is output by the receiving section, for example. "Corrupt" implies a frame which includes a large number of errors, and thus is not recognized as a frame. Note that "/" represents division.

There are proposed a large number of technologies relating to the transmission power control using the outer loop.

Outer loop control, which is described in Technical Report of IEICE, RCS98-18 "Experimental Study of Adaptive Transmission power Control Using Outer Loop in W-CDMA" (referred to as publicly known document 1), determines the CRS for respective wireless frames, measures (actually measures) the FER by means of counting numbers of CRCOK/CRCNG, and then compares the measured FER and a target FER with each other, thereby updating a target receive power value (or a target receive level/interference level ratio). In addition, this publicly known document 1 describes that if an FER observation period (observation number) includes 1000 frames or more, the system can control such that the FER remains approximately at a desired constant value. If there is a sufficiently long FER observation period, the quality can be maintained constant by the outer loop control.

However, according to the publicly known document 1, an observation period long enough for securing the precision of the set value is necessary in order to maintain the quality of the target FER. Specifically, there are following problems, (i) to (iii), relating to the observation period using the conventional method.

(i) A mobile communication system needs a period including at least 100 frames to secure an FER of 1.0%, and a period including more frames to secure a precision corresponding to approximately an FER of 0.1%. Moreover, to secure a precision exactly corresponding to 1.0%, the system needs an observation period including 1000 frames or more as described in the publicly known document 1.

In this case, the period used for estimating the FER increases, and an update cycle of the target receive power value (or target receive power/interference power ratio) thus increases. Accordingly, there increases a period where the inner loop is not operating at a proper value in terms of the receive power value satisfying the target FER, resulting in failing to secure the desired FER.

(ii) If the update cycle is reduced such that the FER achieves the target FER according to the change in the transmission environment, and the target receive power value follows the change of the transmission environment, the FER to be set as the target is restricted by the time period or the number of frames. Accordingly, the desired FER is not achieved.

(iii) In addition, there have recently been increasing demands for high speed data communication. Many protocols for the mobile communication system are designed such that an upper layer assembles data from a lower layer (such as wireless frames). Accordingly, when this type of protocol is used, even if the FER is small on a lower layer, NG frames (error frames) are included when an upper layer assembles the frames, and the frame assembled by the upper layer results in NG frames.

To accommodate this problem, if the BTS or MS receives the NG frame, the upper layer operates to obtain the NG frame again by means of retransmission control. If there often occur retransmitted frames as a result, the throughput used in an actual service decreases on the upper layer compared with the wireless frames actually transmitted/received.

It is thus necessary to reduce the FER (to increase the quality) for providing the high speed data communication service.

Alternatively, Japanese Patent Laid-Open (Kokai) No. HEI 8-181653 (referred to as publicly known document 2 hereinafter) describes a transmission power control method, where either an MS or BTS includes measuring means which measures receive qualities of respective wireless lines, an opponent station includes learning means which learns an average line quality characteristic on the opponent station from the line quality measured by the measuring means, and a target carrier power/interference power ratio is set based on the average line quality characteristic leaned by the learning means. Consequently, the transmission power can be restrained to a necessary minimum value.

However, the transmission power control method described in the publicly known document 2 does not acquire a target receive power value at a high speed.

Thus, when the conventional art is used, if a desired FER value is high, the overall throughput decreases due to the frame retransmission. On the other hand, a long measuring segment (measurement period) is necessary to obtain a FER at a high precision. In addition, if the update cycle of the FER is shorten, an FER at a high precision is not acquired, and thus, a proper power threshold value cannot be set.

On this occasion, it is necessary to reduce the FER in order to reduce the number of the retransmissions. If the FER is small, a considerably long period is necessary to increase the measurement precision of the FER. In this case, the measurement precision of the FER cannot sufficiently follow a transmission characteristic, which changes due to the travel of the mobile station.

The present invention is devised in view of the foregoing problems, and has an object of providing a transmission power control apparatus, a mobile communication system, and a power control method which can carry out the TPC at a high speed, improve the quality of data on a lower layer such as wireless frames, maintain the quality constant, and increase the throughput.

DISCLOSURE OF THE INVENTION

In view of the foregoing, a transmission power control apparatus according to the present invention comprises a measuring section that measures a frame error rate within a predetermined segment, an acquiring section that acquires average frame quality information acquired by averaging plural pieces of quality information per frame based on statistical information of the plural pieces of quality information per frame, a translation table that stores the frame error rate measured by the measuring section and the average frame quality information acquired by the acquiring section, wherein the frame error rate and the average frame quality information are associated with each other, and a transmission power control section that estimates an estimated frame error rate corresponding to the quality information per frame acquired by the acquiring section from the translation table, and controls a target receive power threshold based on the estimated frame error rate and a target frame error rate stored, thereby controlling a transmission power of an opponent communication apparatus.

As a result of this configuration, it is thus possible to set a low frame error rate, and to shorten the update cycle of the target receive power value, resulting in a decrease of the number of retransmissions.

A mobile communication system according to the present invention is characterized in that a transmission power control apparatus includes a measuring section that measures a frame error rate within a predetermined segment, an acquiring section that acquires average frame quality information acquired by averaging plural pieces of quality information per frame based on statistical information of the plural pieces of quality information per frame, a translation table that stores the frame error rate measured by the measuring section and the average frame quality information acquired by the acquiring section, wherein the frame error rate and the average frame quality information are associated with each other, and a transmission power control section that estimates an estimated frame error rate corresponding to the quality information per frame acquired by the acquiring section from the translation table, and controls a target receive power threshold based on the estimated frame error rate and a target frame error rate stored, thereby controlling a transmission power of an opponent communication apparatus.

As a result of this configuration, it is thus possible to shorten the update cycle of the target receive power value in terms of the transmission characteristic which changes according to the travel of the mobile station, resulting in causing the measurement precision of the frame error rate to sufficiently follow the travel speed.

The mobile communication system according to the present invention is different from a conventional mobile communication system which requires a small frame error rate to reduce the retransmission number, in terms of elimination of a long-time measurement for increasing the measurement precision of the frame error rate.

The mobile communication system according to the present invention can estimate the frame error rate in a short period, thereby facilitating maintenance of a desired quality. In addition, it also facilitates setting of the frame error rate to a value less than 1.0%, and thus, it is expected to increase the throughput in the data communication.

Further, the acquiring section may be configured to acquire the average frame quality information based on an average value distribution of the plural pieces of quality information per frame respectively for the plural different frame error rates measured by the measuring section and configured to produce the average value distribution based on numbers of the frame error rate measuring segments from which the frame error rate is acquired and average values of the quality information per frame within the frame error rate measuring segments, and acquires the average frame quality information based on the average value distribution, respectively for the plural different frame error rates. As a result of this configuration, it is possible to quickly update the frame error rate, to increase the throughput, and to optimize the power control.

Further, the translation table may be configured to be provided respectively for plural cells, which are different in transmission environment, and so as to be updated independently for the plural cells, and configured so that the frame error rate and the average frame quality information are updated according to the time zone. These configurations enable power distribution suitable for the respective cells. In addition, there are obtained the suitable translation tables according to changes in the transmission environment (such as changes in the transmission environment due to changes in traffic of vehicles/people and changes in interference quantities from the other cells and within the cell itself due to changes in the quantity of calls (traffic quantity)).

In addition, if a mobile station MS is carrying out a soft handoff between plural cells for which the different translation tables are provided, the transmission power control section may be configured to estimate the estimated frame error rates during the soft handoff according to the qualities in the plural cells. This configuration provides a smooth handoff. Moreover, the quality is improved on the wireless line level; and the quality is maintained constant.

The measuring section may be configured to measure the number of errors of symbols whose symbol length is shorter than the frame length; and this configuration enables to acquire the estimated value of the frame error rate in a short period.

Further, a power control method according to the present invention is provided for the mobile communication system and is characterized by comprising steps of measuring the frame error rate within the predetermined segment, averaging the plural pieces of quality information per frame, producing a translation table that stores the frame error rate measured by the measuring and the average frame quality information acquired by the averaging, wherein the frame error rate and the average frame quality information are associated with each other, estimating an estimated frame error rate corresponding to the quality information per frame from the translation table, controlling the target receive power threshold value and controlling the transmission power of an opponent apparatus based on the estimated frame error rate and a target frame error rate stored in advance.

As a result of this configuration, the target receive power value of the inner loop control is updated by the fast and precise estimation of the frame error rate.

In addition, for example, the transmission power control using the outer loop updates a target receive power value to a lower value if the estimated frame error rate is lower than the target frame error rate, and updates the target receive power value to a higher value if the estimated frame error rate is higher than the target frame error rate; and this configuration enables the transmission power control according to a desired frame error rate.

According to this configuration, the base transceiver station may be configured to use at least either a symbol error number or a ratio derived from the symbol error number as the plural pieces of quality information per frame, the base transceiver station may measure the frame error rate, acquire frame error rate measuring segment identification from which the plural different measured frame error rates are acquired, acquire plural second average symbol error numbers based on distributions represented by the number of occurrences of the plural average symbol error numbers respectively for the plural acquired frame error rate measuring segment numbers, and produce a translation table which associates the frame error rate acquired by the measuring and the second average symbol error number with each other. This configuration enables to update the target receive power value for the inner loop control by means of the precise frame error rate.

BRIEF DESCRIPTION OF THE DRAWINGS

FIG. 9 is a table showing an example of a measurement result of an average SERav according to the embodiment of the present invention;

FIG. 10 is a table showing a result of data rearrangement for average value distributions according to the embodiment of the present invention;

FIG. 19(a) is a table showing a first example of the SER/FER translation table according to the embodiment of the present invention;

FIG. 19(b) is a table showing a second example of the SER/FER translation table according to the embodiment of the present invention.

BEST MODE FOR CARRYING OUT THE INVENTION (A) Description of Embodiment of Present Invention FIG. 1 is a configuration diagram of a mobile communication system according to an embodiment of the present invention. A mobile communication system 100 shown in FIG. 1 is a wireless communication system of the CDMA type, and is capable of transmission power control by using inner loop control and outer loop control.

(1) Configuration of Mobile Communication System 100

Figure 1:
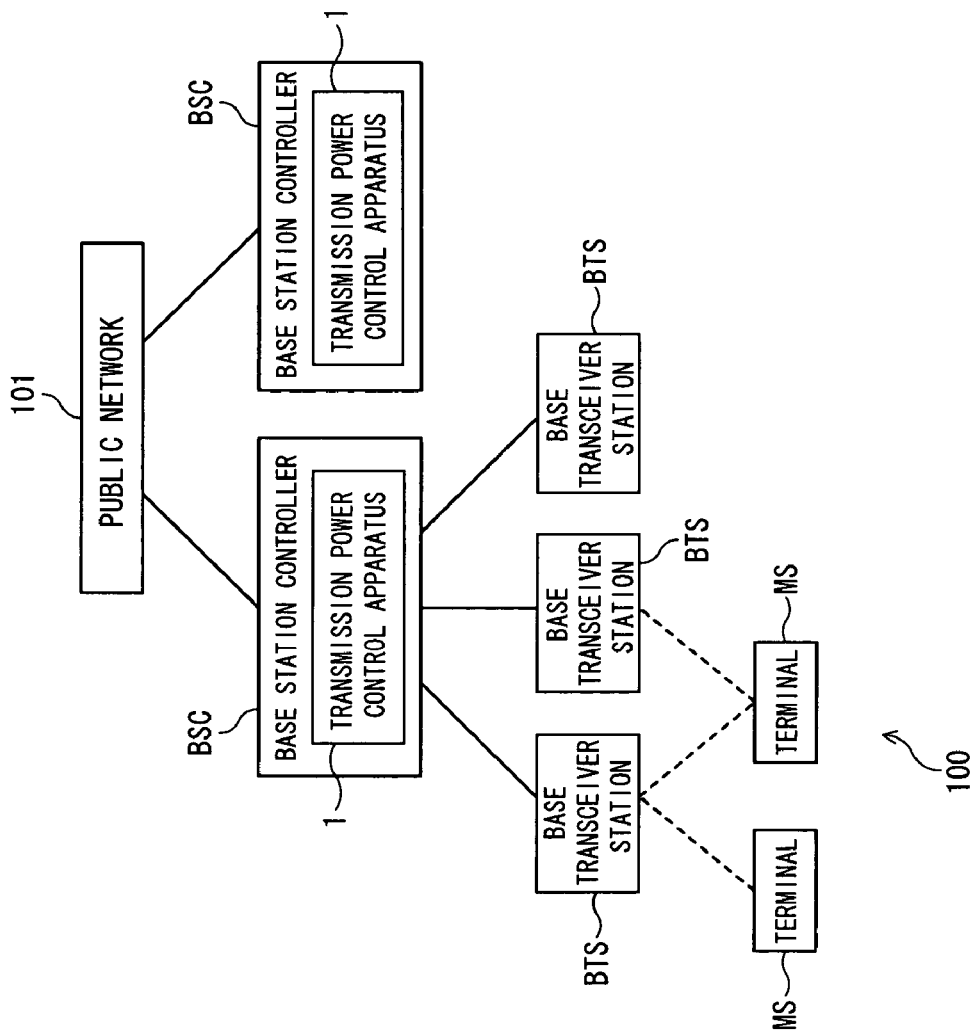
FIG. 1 is a configuration diagram of a mobile communication system according to an embodiment of the present invention.

The mobile communication system 100 shown in FIG. 1 is constituted by a public network 101, plural BSC's (Base Station Controllers), plural BTS's (Base Transceiver Stations), and plural MS's (Mobile Stations: shown as terminals).

(1-1) BSC and Public Network 101

The BSC can update an FER of the BTS based on an FER within a FER estimation period of 2 seconds (sec), and 100 SER's (quality information per frame) for 100 frames included within 2 (sec) of the FER estimation period, for example, and controls plural BTS's. The BSC is provided with a transmission power control apparatus 1 (refer to FIG. 2) according to the present invention, and has various functions such as a channel assignment, a handoff, outgoing/incoming connections, termination control, and maintenance management. These functions are detailed with reference to FIG. 2. Moreover, the BSC always carries out the outer loop control in corporation with the transmission power control apparatus 1 and the BTS. Note that the public network 101 includes a large number of exchanges and a large number of subscriber phones, which are not shown.

The reason for selecting 100 frames as a measuring segment is to obtain a statistical sample number for securing FER 1.0%. If the measurement is carried out by counting an error number of the frames, it is said that a period including 1000 or more frames is necessary for securing an FER of exactly 1.0%. Further, even larger frame number is necessary for securing a high precision of an FER of approximately 0.1%.

(1-2) BTS and MS

The BTS carries out the transmission power control for the MS based on data from the MS and an FER stored in advance. Specifically, the BTS carries out transmission/reception and modulation/demodulation of a code spread wireless signal, and always controls increase and decrease of the wireless transmission power.

The MS is capable of transmission power control, and serves a mobile phone or a mobile wireless terminal operated by a subscriber, for example. The MS and BTS respectively and always carry out the inner loop control for the up and down links in W-CDMA (the reverse and forward links in cdma2000). Note that solid lines and dotted lines shown in FIG. 1 respectively indicate wired connections and wireless connections.

(1-3) Up Frame (or Reverse Frame) Format

Figure 5:
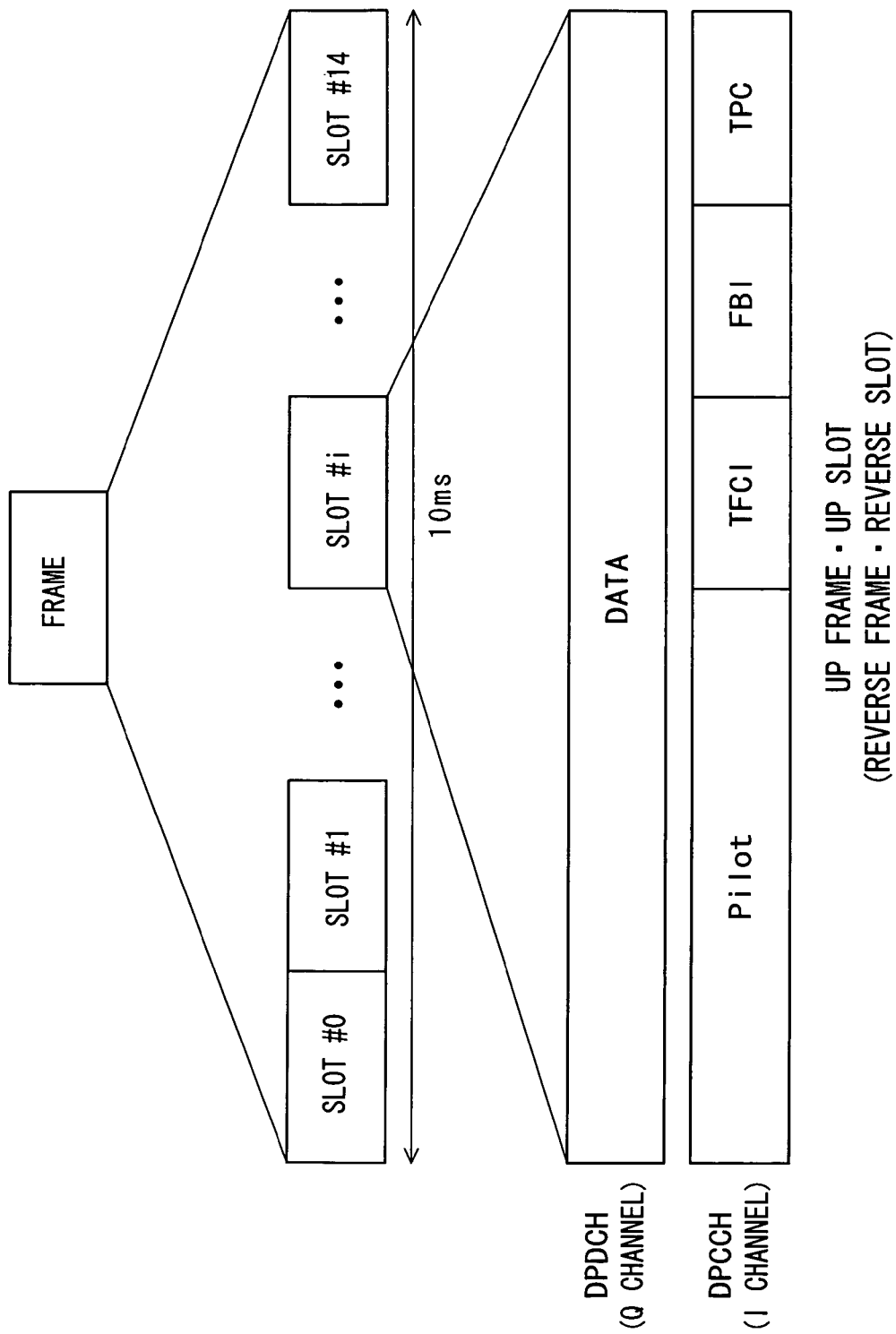
FIG. 5 is a diagram showing an example of a frame format of an up link (or a reverse link) according to the embodiment of the present invention.

FIG. 5 is a diagram showing an example of a frame format of the up link (for W-CDMA system), or reverse link (for cdma2000 system) according to the embodiment of the present invention. The duration of the frame of the up link (referred to as up frame hereinafter) or the frame of the reverse link (referred to as reverse frame hereinafter) shown in FIG. 5 (referred to as up frame length, or as reverse frame length hereinafter) is 10 (msec) for the W-CDMA system, and one up frame consists of 15 slots (duration of one slot is 666[μsec]). On the other hand, the reverse frame length is variable up to 20 (msec) for the cdma2000 system; and the duration of one slot is 1.25 (msec). Consequently, the inner loop control is carried out every slot period.

The up link has a channel for information data, DPDCH (Dedicated Physical Data Channel), and a channel for control information, DPCCH (Dedicated Physical Control Channel). "Pilot" included in the DPCCH implies pilot bits (pilot symbol), and represents information relating to a type of the frame, to which are inserted the up channel (W-CDMA) or reverse channel (cdma2000), the bit rate, the symbol rate, and a different pattern respectively assigned to a respective subscriber.

"TFCI (Transport Format Combination Indicator)" indicates information relating to the transmission rate and the like, and usually includes two bits, "11" or "00", which respectively imply on and off of a TPC command. The number of bits included in the TFCI may be 4, 8, or 16, and the TFCI is represented as "1111" or "0000" in case of four bits. If the bit length becomes longer, TPC bits are surely detected by a receiving party.

"FBI" (FeedBack Information) represents information on transmission diversity and the like. Note that the DPDCH and DPCCH are respectively mapped to the Q (Quadrature) component and the I (In-Phase) component of the QPSK (Quadrature Phase Shift Keying) modulation for transmission, and as a result, the DPCCH is transmitted successively in terms of time even if the DPDCH is not present.

(1-4) Down Frame (or Forward Frame) Format

Figure 6:
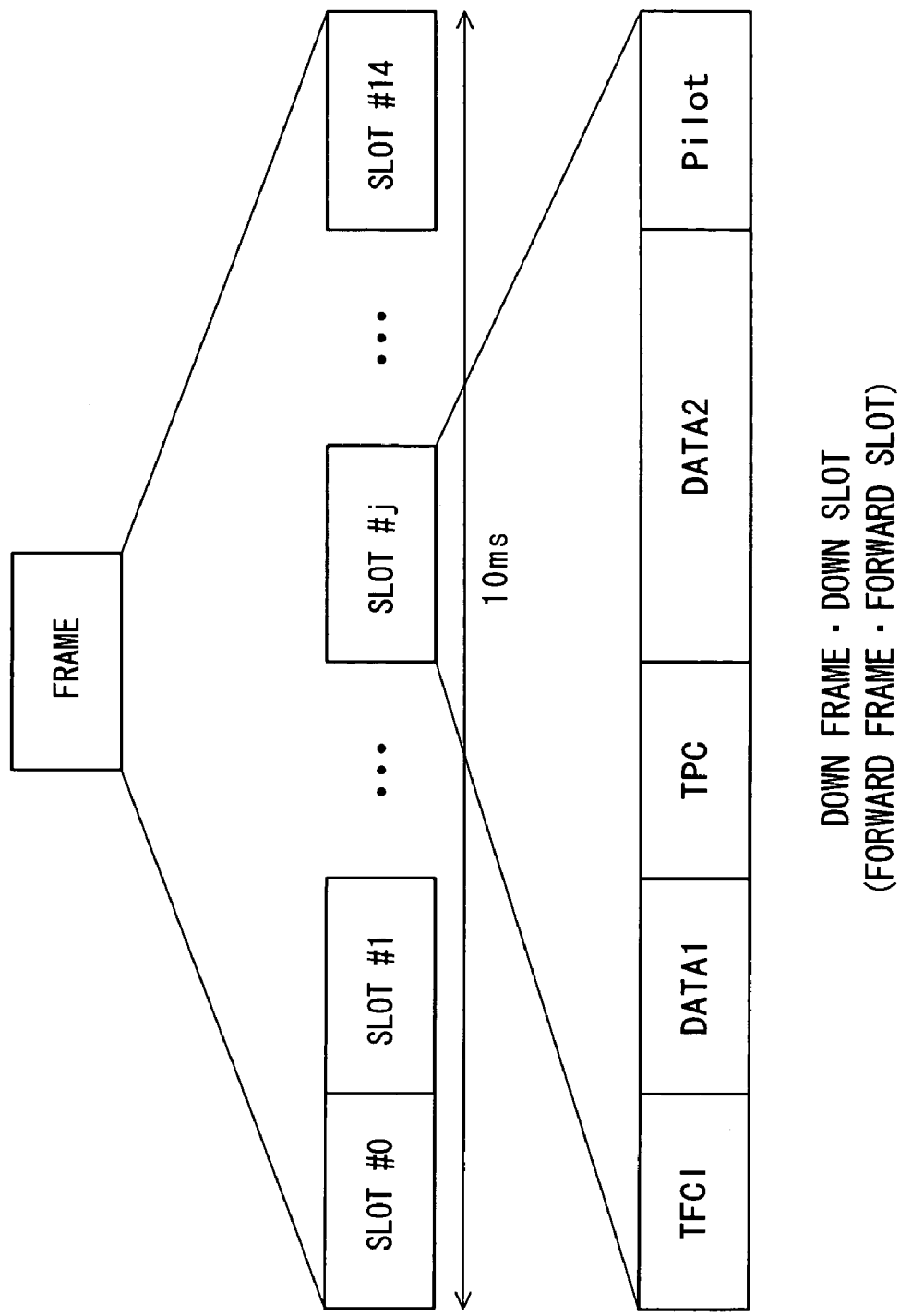
FIG. 6 is a diagram showing an example of a frame format of a down link (or a forward link) according to the embodiment of the present invention.

FIG. 6 is a diagram showing an example of a frame format of the down link for W-CDMA system (or the forward link for cdma2000 system) according to the embodiment of the present invention. The length of the frame of the down link (referred to as down frame hereinafter) or the frame of the forward link (referred to as forward frame hereinafter) shown in FIG. 6 is also 10 (msec) or up to 20 (msec) respectively for the W-CDMA system and the cdma2000 system. TPC includes feedback information for the inner loop control, and is set by the BTS.

With this configuration, the BTS measures a receive power at the BTS for the Pilot transmitted by the MS, and compares the receive power at the BTS and a target receive power threshold value for the MS, thereby transmitting the TPC command.

(1-5) Inner Loop Control

The BTS (refer to FIG. 1) applies primary modulation to data of respective plural calls transmitted from the public network 101, thereby converting to wireless signals, and transmits spread wireless signals obtained by assigning different spread codes for the respective MS's. On the other hand, the respective MS's receive the spread wireless signals transmitted by the BTS to MS's other than that transmitted to the MS itself as interference noises. The BTS thus carries out the transmission power control respectively for the plural MS's within a cell, thereby preventing the receive quality on other MS's from degrading. As a result of the transmission power control, the number of the MS's which can transmit/receive increases, and the throughput of the mobile communication system 100 increases.

(2) Power Control Methods on MS, BTS, and BSC (2-1) Power Control Method on MS

Figure 2:
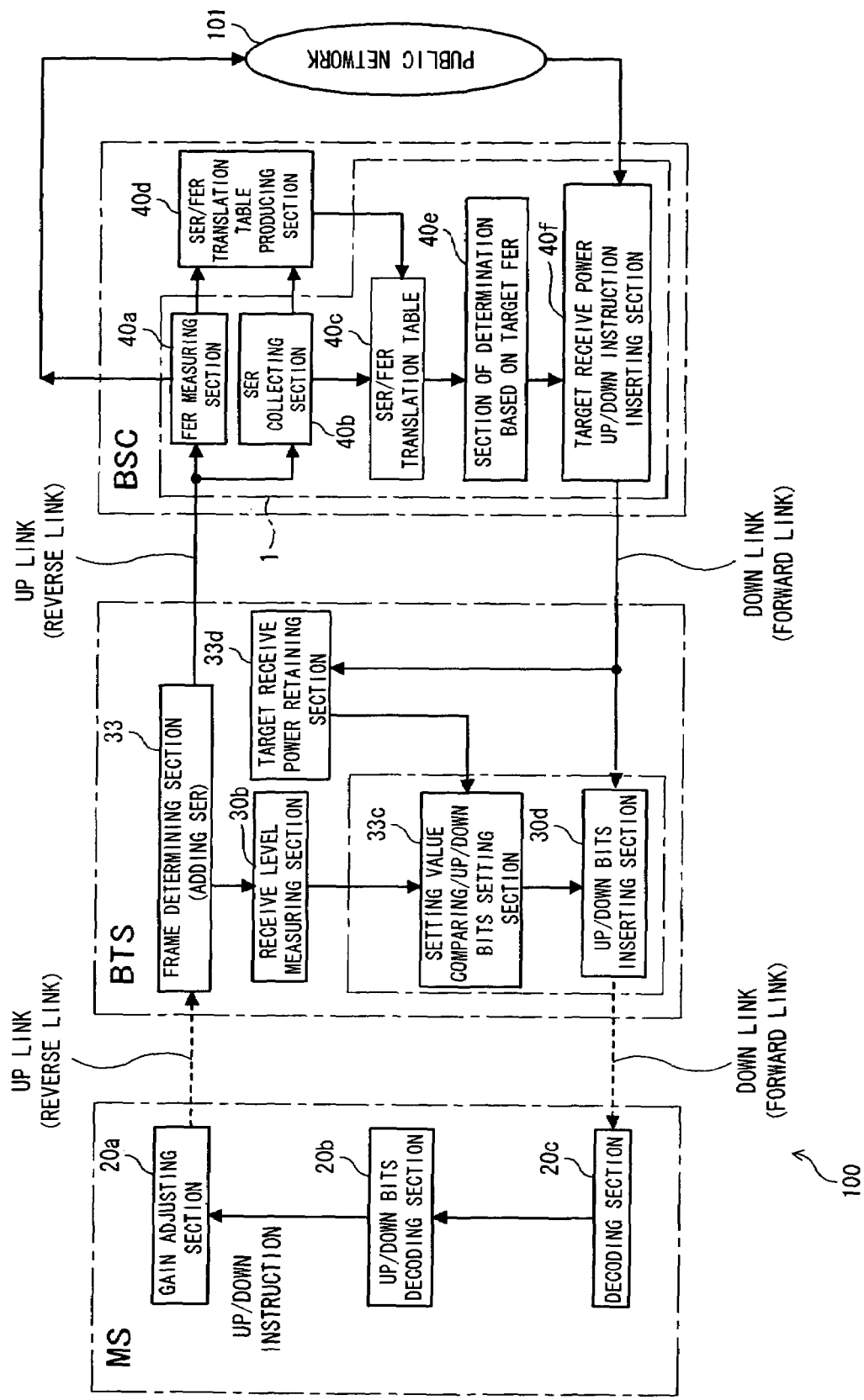
FIG. 2 is a diagram describing a power control method according to the embodiment of the present invention.

FIG. 2 is a diagram describing a power control method according to the embodiment of the present invention. The MS shown in FIG. 2 is constituted by a gain adjusting section 20a, an up/down bit decoding section 20b, and a decoding section 20c. The decoding section 20c extracts and outputs control data such as the TPC, and the information data contained in the frame output from a wireless transmitting/receiving section (not shown).

The up/down bit decoding section 20b determines whether the TPC control data contained in the control data output by the decoding section 20c indicates transmission power up or transmission power down, inputs "Transmission power up" to the gain adjusting section 20a if the result is the transmission power up, and inputs "Transmission power down" to the gain adjusting section 20a if the result is the transmission power down. The gain adjusting section 20a ups/downs the transmission power based on the up or down input by the up/down bit decoding section 20b.

(2-2) Power Control Method on BTS

The BTS is constituted by a frame determining section 33, a receive level measuring section 30b, a target receive power retaining section 33d, and a set value comparing/up/down bits setting section (referred to as comparing/setting section hereinafter) 33c.

The frame determining section 33 realizes respective functions including frame demodulation, measurement/determination of a frame state, detection of the frame rate, and discrimination of the channel type. The frame state (average SERav described later) measured by the frame determining section 33 along with the information data and the CRC determination result are transmitted to the BSC, and the power control method according to the present invention is carried out on the BSC.

The receive level measuring section 30b measures the receive power value of the receive frame demodulated by the frame determining section 33.

The target receive power retaining section 33d retains a threshold value set in advance.

Figure 4:
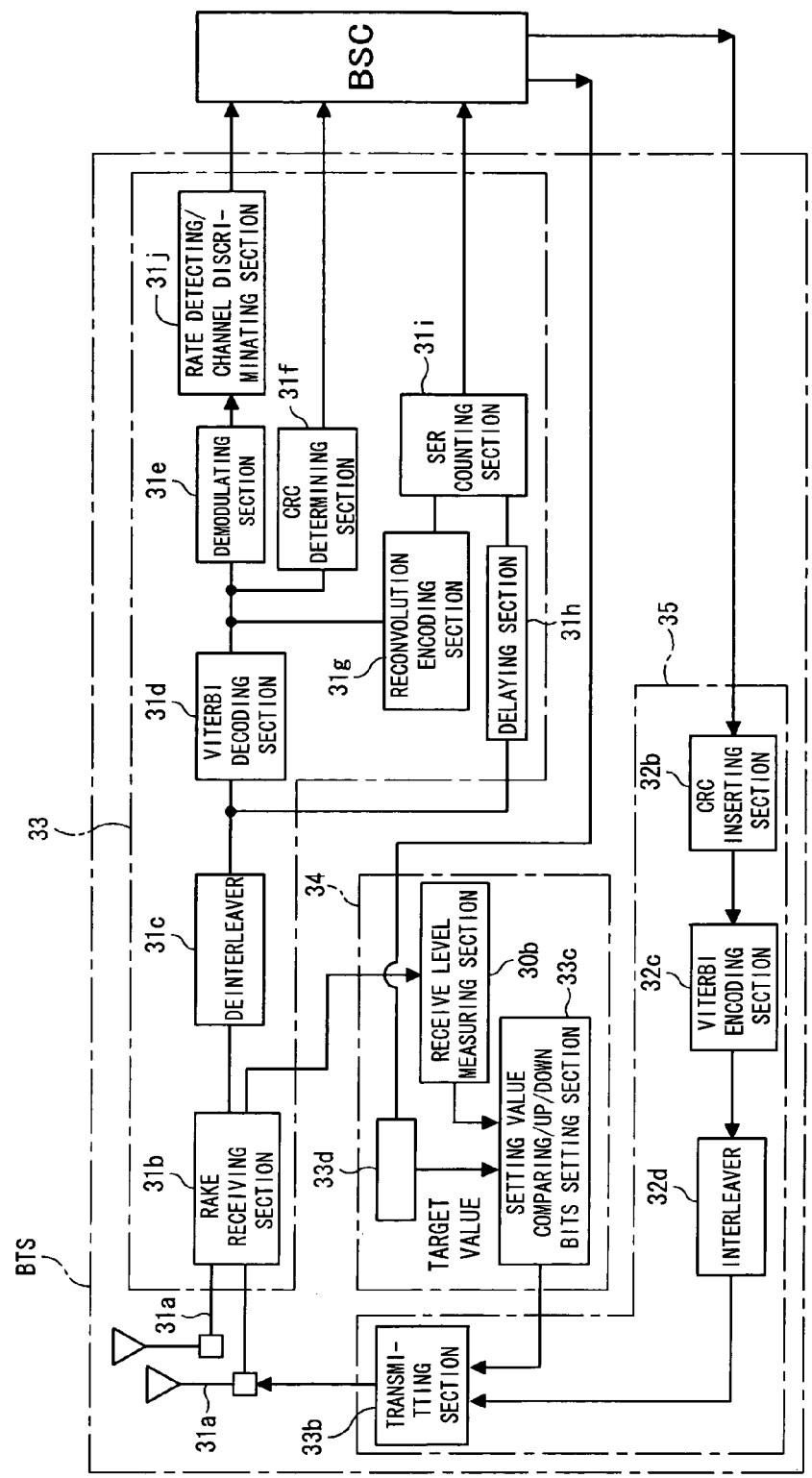
FIG. 4 is a block diagram of a BTS according to the embodiment of the present invention.

The comparing/setting section 33c compares the receive power value from the receive level measuring section 30b with the threshold value retained by the target receive power retaining section 33d, sets the command representing the power value up or power value down to the TPC bits to be transmitted to the MS based on the comparison result, and inserts the TPC bits, to which the command is set, to the down frame (W-CDMA) or forward frame (cdma2000) Note that the target receive power retaining section 33d and the comparing/setting section 33c serve as a transmitting section 35 (refer to FIG. 4).

A more detailed description will be given of these functions with reference to FIG. 4.

(2-3) Configuration of BTS

FIG. 4 is a block diagram of the BTS according to the embodiment of the present invention. The BTS shown in FIG. 4 is provided with an antenna section 31a and the frame determining section 33, and is further constituted by a forward transmission power control section 34 including the receive level measuring section 30b, the target receive power retaining section (target value) 33d and the comparing/setting section 33c, and the transmitting section 35.

(2-3-1) Antenna Section 31a

The antenna section 31a includes two antennas for receive diversity as an example of the present embodiment. The wireless signal transmitted by one MS is reflected by buildings and the like, and reaches the antenna section 31a as a multipath fading signal.

(2-3-2) Further Description of Frame Determining Section 33.

(i) Frame Demodulating Function

The frame demodulating function is realized by a cooperation of a Rake receiving section 31b and a deinterleaver 31c. The Rake receiving section 31b composes and despreads multipath signals from the antenna section 31a, thereby outputting received data, and outputs data to the receive level measuring section 30b of the forward transmission power control section 34 for the receive level measurement. The deinterleaver 31c deinterleaves wireless data interleaved by an interleaver (not shown) of the MS.

As a result, the receive quality of the wireless signals from the MS is improved by the Rake receiving section 31b by means of the composition of the power values of the plural wireless signals delayed by phase and time shifts due to a difference in plural path lengths.

(ii) Detecting Function of Frame Rate and Discriminating Function of Channel Types Note that a rate detecting/channel discriminating section 31j provided on the output side of the frame determining section 33 detects frame rate information contained in the demodulated data output from the demodulating section 31e, and discriminates the channel type of the received frame. The frame rate information and the channel type are then input to a main control section (not shown) as control information, thereby controlling operations of the entire BTS.

(iii) Measuring/Determining Function of Frame State

A description will now be given of the present embodiment with a convolutional code as an example. Other error correcting codes such as turbo code may be used in a similar manner.

The measuring/determining function of the frame state is realized by cooperation of a viterbi decoding section 31d, a demodulating section 31e, a CRC determining section 31f, a reconvolution encoding section 31g, a delaying section 31h, and an SER counting section 31i.

The viterbi decoding section 31d decodes data encoded with convolution by the MS, and outputs the decoded data; the demodulating section 31e demodulates the decoded data output from the viterbi decoding section 31*d*; and the CRC determining section 31*f* determines the decoded data output by the viterbi decoding section 31*d* based on the CRC thereby outputting CRCOK or CRCNG.

The reconvolution encoding section 31*g* then encodes the output data from the viterbi decoding section 31*d* again by means of the reconvolution. The delaying section 31*h* delays the data before the viterbi decoding for a predetermined period and outputs the data. The delay time elapses at least as late as the processing on the reconvolution encoding section 31*g* is completed, and is used to adjust the data timing before the viterbi decoding and the timing after the reconvolution encoding.

The SER counting section 31*i* compares modulated symbols (simply referred to as symbol hereinafter) before the viterbi decoding and symbols after the viterbi decoding for every single frame, counts the number of different symbols, and outputs the count value as the number of errors of the symbols contained in one frame (quality information per frame). If the communication state is the most idealistic, the symbols before and after the decoding are the same, and the number of the errors is thus 0. The symbol error number increases according to degradation of the environment. Since the error number of the symbols is counted and output for every single frame, the number is output as an averaged value of the error numbers, which is obtained by averaging across one FER measuring segment.

Figure 7A:
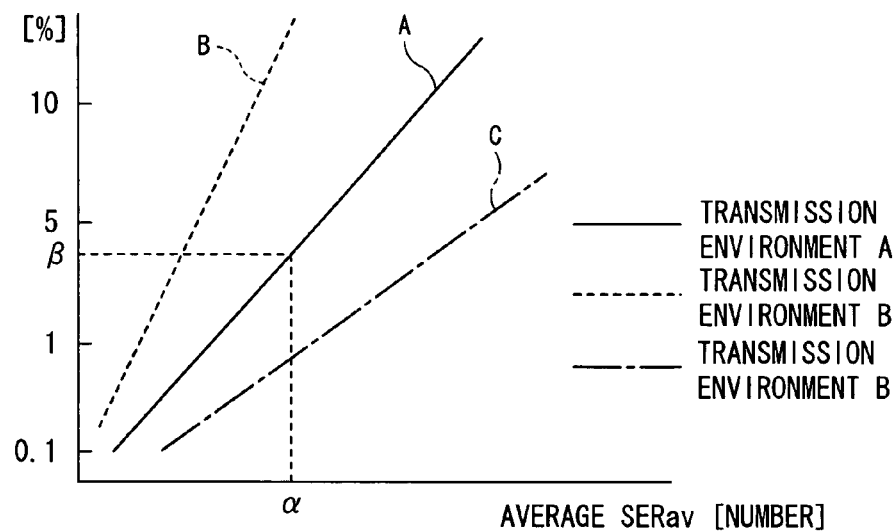
FIG. 7(a) is a chart produced by an SER/FER translation table section according to the embodiment of the present invention.
Figure 7B:
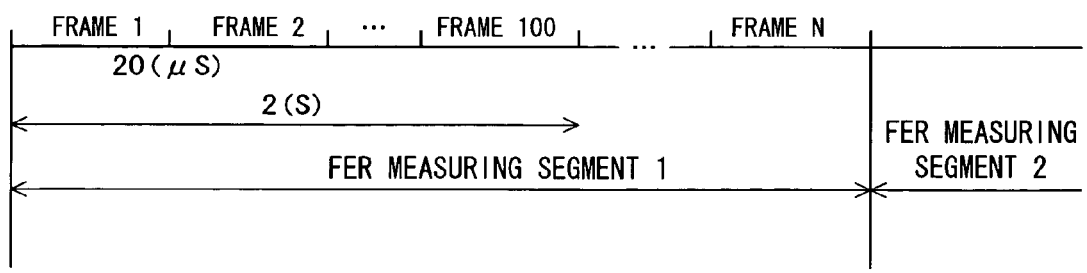
FIG. 7(b) is a diagram describing an FER measuring segment according to the embodiment of the present invention.

FIG. 7(*b*) is a diagram describing the FER measuring segment according to the embodiment of the present invention. The FER measuring segment 1 shown in FIG. 7(*b*) is a period used for calculating SERav and FERrel, and the SERav and the like are measured in the FER measuring segments 1, 2, . . . , (the rest is not shown). The respective FER measuring segments 1, 2, and the like include a frame 1 to a frame N (N represents a natural number equal to or more than 2), all the durations of the respective frame 1 to frame N are 20 micro second (μS), and the duration from the frame 1 to frame 100 is 2 sec (S). For collection over a long segment, the SERav and FERrel are calculated during the respective FER measuring segments 1, 2, . . . The FER measuring segment is reset for the frame 100+N.

(iv) Measurement Result of Average SERav

FIG. 9 is a table showing an example of the measurement result of the average SERav's according to the embodiment of the present invention. The measurement result shown in FIG. 9 records the average SERav's and FERrel's for all of the 100 FER measuring segments, the FER measuring segment 1 to the FER measuring segment 100. If a call is generated between the BSC and the MS, the BSC buffers the wireless data from the MS, and if the data corresponding to the one FER measuring segment is accumulated, the average SERav is measured for the FER measuring segment 1, and is output as 10, for example.

Simultaneously, the BSC outputs the FERrel as 1.0%, for example, which is measured during the processing of the FER measuring segment 1, and the measured data, which are associated with the FER measuring segment 1, are recorded. The BSC then carries out processing, which is similar to that for the frame 1, for all the FER measuring segment 2 to the FER measuring segment 100.

Note that a symbol error rate (number of generated symbol errors/number of all symbols per frame) represented in percent % may be used as the SER instead of the symbol error number.

As a result, the data output by the deinterleaver 31*c* (refer to FIG. 4) undergoes the powerful error correction by the viterbi decoding section 31*d*; the error-corrected data is demodulated by the demodulating section 31*e*; and the rate detecting/channel discriminating section 31*j* then detects the desired data from the demodulated data. Moreover, the CRC determining section 31*f* applies the CRC determination to the data from the viterbi decoding section 31*d*, and the CRC determination result is input to the BSC, and is used to calculate the FER.

Further, the receive data from the deinterleaver 31*c* is delayed by the delaying section 31*h*, and is then input to the SER counting section 31*i*. The data after being decoded by the viterbi decoding section 31*d* is encoded again by the reconvolution encoding section 31*g*, and is input to the SER counting section 31*i*. The symbol error number is then output as the average SERav averaged over one FER measuring segment by the SER counting section 31*i*. In other words, the delaying section 31*h* and the reconvolution encoding section 31*g* are provided respectively on the input side and output side of the viterbi decoding section 31*d*, and the SER counting section 31*i* thus counts the difference in quality between before and after the decoding.

In this way, the frame determining section 33 collects the information data contained in the frames transmitted from the MS, the CRC determination results (CRCOK or CRCNG) for the frames, and the quality information for the respective frames (quality information per frame).

(2-3-3) Forward Transmission Power Control Section 34

The forward transmission power control section 34 shown in FIG. 4 instructs the MS to control the transmission power based on the receive power value of the up link (W-CDMA) or reverse link (cdma2000) and the target receive power threshold value, and includes the receive level measuring section 30*b*, the target receive power retaining section (shows as "Target value") 33*d*, and the comparing/setting section 33*c*.

(2-3-4) Receive Level Measuring Section 30*b*

The receive level measuring section 30*b* is connected to the Rake receiving section 31*b*, and measures the receive power value using the channel included in the up link (W-CDMA) or reverse link (cdma2000), for example. According to the measuring method of the receive power value, the respective channel assigned to the respective subscriber includes the Pilot, and the total power including communicating channels (traffic channel, also referred to as Tch) of the MS has a certain ratio to the power of the Pilot on the up link (or reverse link), and is fixed. The receive level measuring section 30*b* thus measures the Pilot, and outputs the measured Pilot power as the receive power value. Note that other measuring methods may be used.

(2-3-5) Target Receive Power Retaining Section 33*d*

The target receive power retaining section 33*d* adds/subtracts up/down data input by the BSC to/from the target receive power threshold value presently retained. The target receive power threshold value is used to compare with the receive power on the comparing/setting section 33*c*.

(2-3-6) Comparing/Setting Section 33*c*

The comparing/setting section 33*c* compares the receive level from the receive level measuring section 30*b* with the threshold value set by the target receive power retaining section 33*d*, and sets the TPC bits to the up/down respectively if the receive level is higher or lower.

(2-3-7) Transmitting Section 35

The transmitting section 35 shown in FIG. 4 modulates/transmits data on the down link (W-CDMA) or forward link (cdma2000), and is constituted by a CRC inserting section 32*b*, a viterbi encoding section 32*c*, an interleaver 32*d*, and a transmitting section 33*b*. The CRC inserting section 32*b* calculates/inserts the CRC bits for the respective transmission frame on the down link (or forward link); the viterbi encoding section 32c encodes the data after the CRC processing by means of the convolution; the interleaver 32d interleaves the data encoded by means of convolution; and the transmitting section 33b converts the interleaved data to a radio signal of the CDMA type, and outputs the signal. Note that a description will be given assuming that there is one MS.

As a result, the input information data undergoes the respective processing including the CRC, the viterbi encoding, and the interleave, the TPC bits representing the up/down output by the comparing/setting section 33c are inserted to the information data, which has undergone the respective processing on the transmitting section 33b, and is output by the antenna section 31a.

Moreover, the BTS (refer to FIG. 2) demodulates the radio signal from the MS, transmits the demodulated data to the BSC, applies radio frequency modulation to the call data input by the BSC, and transmits the data to the MS. Further, the BTS measures the receive level of the transmission power value transmitted by the MS, sets the TPC bits based on the result of the comparison between the receive level and the target value set by the BSC, and transmits the information data and control data including the TPC bits to the MS. The transmission power control on the up link (or reverse link) is carried out in this way.

(4) Power Control Method on BSC

The BSC shown in FIG. 2 is constituted by an FER measuring section (measuring section) 40a, an SER collecting section (acquiring section) 40b, an SER/FER translation table (translation table) 40c, an SER/FER translation table producing section 40d, a comparing/determining section 40e, and an up/down instruction information inserting section (target receive power up/down instruction inserting section) 40f.

(4-1) FER Measuring Section 40a

The FER measuring section 40a measures the FER in the FER measuring segment. The FER measuring section 40a also transmits the information data, which has been transmitted by the MS, and has been received from the BTS, to the public network 101.

Note that the FER measuring section 40a includes a net side interface section (not shown) which applies predetermined format processing to the information data according to an interface with the public network 101 side. The public network 101 includes a mobile communication network and a fixed network (such as a Wireless Local Loop), for example, and different interfaces are respectively used for them between the public network 101 and the BSC. Moreover, the BSC may be connected to different networks such as an audio communication network and a packet network. It is thus necessary to adapt to regulations of the interface with the public network 101, and the respective apparatuses (respective units) in the BSC are preferably provided according to the communication applications.

(4-2) SER Collecting Section 40b

The SER collecting section 40b collects the SER values from the BTS for a certain period, thereby outputting the average SERav.

(4-3) SER/FER Translation Table 40c

The SER/FER translation table 40c is a section (such as a memory) which retains the FER's measured by the FER measuring section 40a and the average frame quality information acquired by the SER collecting section 40b, which are associated with each other, and outputs the estimated FER corresponding to the input average SERav.

(4-4) SER/FER Translation Table Producing Section 40d

The SER/FER translation table producing section 40d produces the SER/FER translation table 40c based on the FER's output from the FER measuring section 40a.

(4-5) Comparing/Determining Section 40e

The comparing/determining section 40e compares the estimated FER output from the SER/FER translation table 40c with the target FER, thereby outputting the instruction which ups/downs the target receive power threshold value retained by the BTS; and the up/down instruction information inserting section 40f inserts the up/down instruction which ups/downs the receive power threshold value retained by the BTS based on the instruction from the comparing/determining section 40e. Then, the comparing/determining section 40e and the up/down instruction information inserting section 40f cooperate to serve as a transmission power control section (40e, 40f), estimate the estimated FER corresponding to the SER acquired by the SER collecting section 40b from the SER/FER translation table 40c, and control the target receive power threshold value based on the estimated FER and the target FER stored in advance, thereby controlling the transmit value. The outer loop control is thus carried out.

(4-6) Transmission Power Control Apparatus 1

Additionally, the FER measuring section 40a, the SER collecting section 40b, the SER/FER translation table 40c, the comparing/determining section 40e, and the up/down instruction information inserting section 40f shown in FIG. 2 cooperates to serve as a transmission power control apparatus 1.

(5) Conventional Power Control Method

Figure 3:
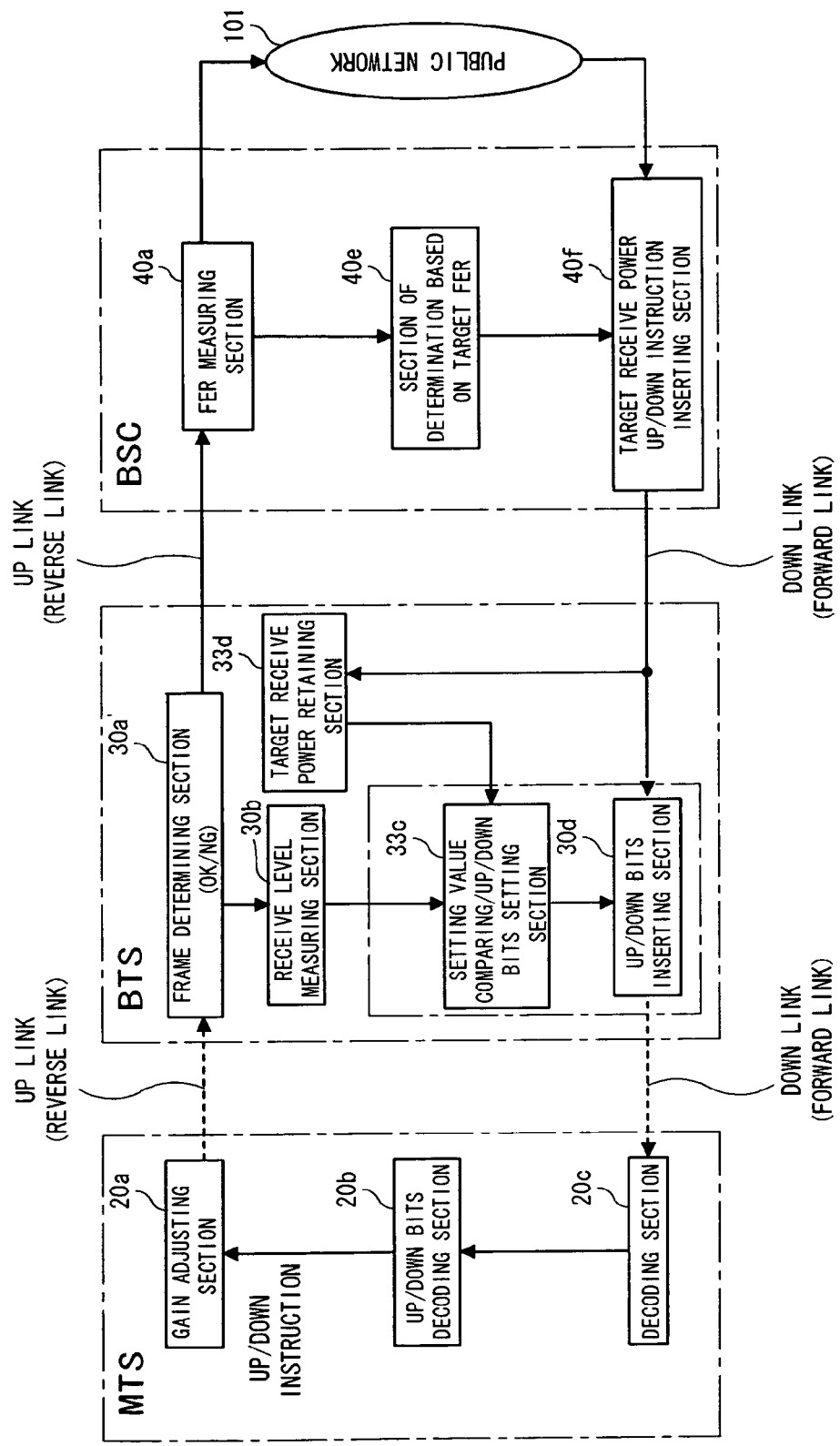
FIG. 3 is a diagram describing a conventional power control method.

FIG. 3 is a diagram describing a conventional power control method. A frame determining section 30a' of a BTS shown in FIG. 3 only determines the CRCOK or CRCNG, and outputs the determination result to the BSC. Moreover, both the SER/FER translation table 40c and SER/FER translation table producing section 40d are not provided in the BSC, and the outer loop control is carried out based on an FER acquired by FER measurement acquired by counting the CRCNG. Note that the other components are the same as the components described above or provide similar functions to those of the components described above.

In more detail, according to the conventional outer loop control, the CRC is determined for the frame received from the MS, and the resulting CRCOK or CRCNG is collected by the BSC. The FER determining section 40a of the BSC acquires the FER, and the acquired measured FER and the target FER are compared with each other by the comparing/determining section 40e. If the measured FER is lower than the target FER, the comparing/determining section 40e determines that the target receive power value set on the BTS is "High", and instructs the BTS to down the target power value. Alternatively, if the measured FER is higher than the target FER, the comparing/measuring section 40e determines "Insufficient transmission power", and instructs the BTS to up the target receive power value.

(6) Power Control Method of the Present Invention

The power control method according to the present invention is carried out using the outer loop control on the BTS and BSC as described in the following sections (6-1) to (6-4).

(6-1) If a call is generated, the BTS measures the SER of respective frame, also carries out the CRC determination (CRCOK or CRCNG) for the frames, and transmits the measured SER value and the CRC determination result to the BSC.

(6-2) The SER collecting section 40b in the BSC averages the SER's of the frames collected within the measured FER measuring segment. Namely, the SER collecting section 40b collects the quality information SER on the plural wireless frames and the actually acquired FER as the statistical information, calculates the average SER of the SER values collected within the certain period, and inputs the average SERav to the SER/FER translation table producing section 40d. In other words, the SER collecting section 40b acquires the average SERav obtained by averaging plural SER's based on the plural SER statistical information. The FER measuring section 40a measures the FER in the above segment, and outputs the FER as the FERrel to the SER/FER translation table producing section 40d.

(6-3) The SER/FER translation table producing section 40d produces or updates the SER/FER translation table which stores the estimated FER's acquired by the measurement and the average SERav acquired by averaging, which are associated with each other, and further estimates the estimated FER corresponding to the SER acquired by the measurement from the SER/FER translation table 40c.

(6-4) The comparing/determining section 40e compares the calculated FERrel with the target FER; if the estimated FER is smaller than the target FER, the comparing/determining section 40e determines that the target receive power value is large on the BTS, and updates the target receive power value to a smaller value; and if the estimated FER is larger than the target FER, the comparing/determining section 40e determines that the target receive power value is small, and updates the target receive power value to a larger value. Then, the up/down instruction information inserting section 40f transmits the up/down instruction intended for the target receive power value retained by the BTS based on the comparison result. Namely, the transmission power control section (40e, 40f) carries out the transmission power control based on the estimated FER and the target FER stored in advance.

The outer loop control is carried out in this way, thereby enabling fast transmission power control.

(7) How to Produce SER/FER Translation Table 40c (7-1) Data to be Used

The SER/FER translation table producing section 40d shown in FIG. 3 collects the SER's transmitted by the BTS and the FER's counted by the BSC. Data used by the SER/FER translation table producing section 40d are the following (X1) to (X5). In the following section, n implies a natural number equal to or more than 2.

(X1) SERn: SER of the n-th frame (symbol error number)

(X2) N: Number of received frames determined as the CRCOK within an FER estimating period (X3) C: Number of corrupt frames within the FER estimating period (X4) T: FER estimating period (example: 2 [sec])

(X5) G: Number of received frames determined as the CRCNG within the FER estimating period (7-2) Calculation Example of Measured SER Value The CRCOK frame and CRCNG frame respectively represent a received frame determined as CRCOK and a received frame determined as CRCNG as a result of the CRC determination. The corrupt frame implies a frame which is transmitted by an opponent apparatus, but is not received as any data, and is determined based on the CRCNG and the receive level. In addition, the CRCNG frame and the corrupt frame are both counted as the frame error.

The SER/FER translation table producing section 40d fixes the error number to SERmax if the corrupt error occurs, and calculates the total number of the SER's within the period T using an equation (Z2). Note that * and Σ respectively represent a multiplication and a summation from 1 to n.

$$\text{Total number of } SER\text{'s} = \Sigma SERn + SERmax*C \tag{Z2}$$

Thus, the average SERav per frame received by the BSC within the period T is calculated as an equation (Z3) shows:

$$\text{Average } SERav = (\Sigma SERn + SERmax*C)/(N+C+G) \tag{Z3}$$

The SER/FER translation table producing section 40d calculates the actual FERrel using the CRCNG frame number, the received frame number, and the corrupt frame number acquired within the FER estimating period in addition to this calculation as an equation (Z4) shows:

$$FERrel = (C+G)/(N+C+G) \tag{Z4}$$

There are obtained SER/FER translation charts (three types of lines) shown in FIG. 7(a), which are different from each other according to transmission environments A, B, and C, by plotting the average SERav and FERrel. The SER/FER translation charts shown in FIG. 7(a) describe the correspondence between the average SERav data and the FERrel data retained by the SER/FER translation table 40c, and includes the three lines A, B, and C, different according to the transmission environments A, B, and C.

If the SER collecting section 40b of the BSC (refer to FIG. 3) inputs α (average SERav), for example, to the SER/FER translation table 40c, β% on the vertical axis is obtained as an FER. Namely, the SER/FER translation table 40c functions as a lookup memory, and if the SER collecting section 40b inputs an address to the lookup memory, a proper FER is immediately obtained.

The measuring period used to obtain the FER is thus largely decreased or eliminated; and the power control adapted to the wireless line quality can be carried out at an extremely high speed. If the average SERav shown in FIG. 7(a) is close to 0, the FER is also close to 0; and if the average SERav increases, the FER also increases linearly.

The lines A, B, and C shown in FIG. 7(a) are respectively different in a relationship represented as average SERav/FER. The transmission environment implies a surrounding environment such as a city area, suburb area, high-rise buildings, or mountains; and the transmission characteristic varies according to the surrounding environments.

Accordingly, the BSC generates data pairs corresponding to (α, β) shown in FIG. 7(a) from the SER's and FER's acquired in the certain period, and produces or updates the SER/FER translation table 40c using the generated data pairs.

Moreover, there is considered a case where the transmission environment changes as the time elapses, and the FER's and the average SERav's are updated on the SER/FER translation table 40c according to the time zone. The SER collecting section 40b collects the actual FERrel's as the statistical information, and periodically updates the table, thereby acquiring the optimized data according to changes in the communication time zone or the transmission environment.

(7-3) Flowchart of Producing SER/FER Translation Table 40c

Figure 8:
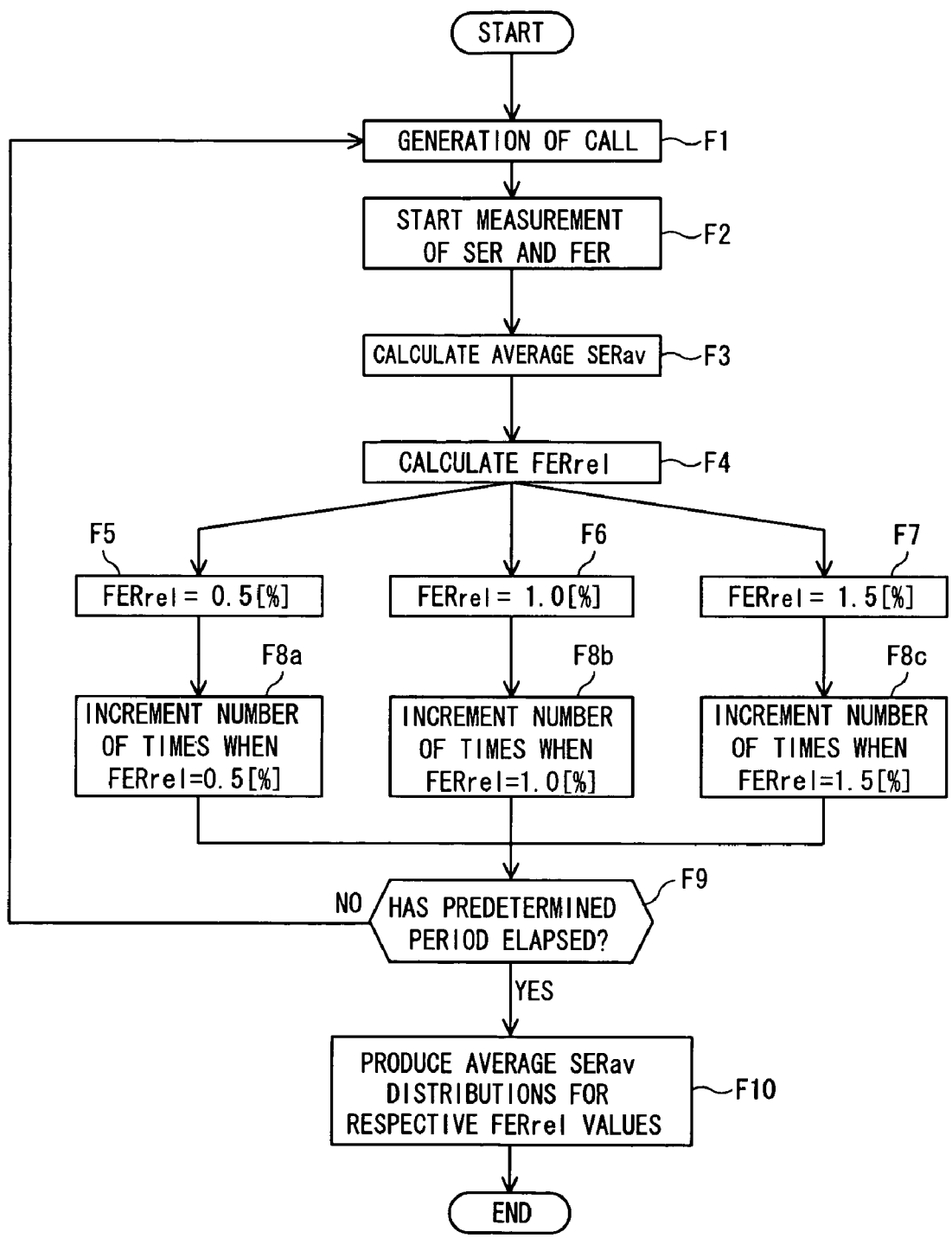
FIG. 8 is a flowchart describing how to produce an SER/FER translation table according to the embodiment of the present invention.

FIG. 8 is a flowchart describing how to produce the SER/FER translation table 40c according to the embodiment of the present invention. If a call is generated (step F1), the measurement of the SER and FER starts (step F2). The SER/FER translation table producing section 40*d* then calculates the average SERav (step F3), and calculates the FERrel (step F4).

Then, if the FERrel is 0.5(%), 1.0(%), or 1.5(%) (steps F5, F6, or F7), there is incremented the respective number of times when the FERrel is 0.5(%), 1.0(%), or 1.5(%) (step F8*a*, F8*b*, or F8*c*). Note that if there is required the SER/FER translation table 40*c* corresponding to the FERrel of 2.0(%) or more, the FERrel equal to or more than 2.0(%) is obtained by calculation.

Then, it is determined whether the certain period has elapsed or not (step F9); the procedure proceeds on a "Yes" route if the period has elapsed; and the SER/FER translation table 40*c* produces the average SERav's at the respective FERrel's (step F10). On the other hand, if the certain period has not elapsed in the step F9, the procedure proceeds on a "No" route, and all the SER/FER translation table 40*c*, the FER measuring section 40*a*, and the SER collecting section 40*b* carry out the processing starting from the step F1 again.

As the producing method of the SER/FER translation table 40*c*, the BSC first measures the FER of a k-th connected call (k is a natural number equal to or more than 2), and designates the measured FER as the FERrel. The BSC then calculates the average SERav of the k-th connected call. The average SER value calculated on this occasion is designated as the average SERav. The BSC further acquires and plots plural call data on the chart. The BSC then generates the SER/FER translation table 40*c* which retains the number representing the average SERav and the number of generations of the FERrel when this average SERav is generated, which are associated with each other.

(Y1) As means for estimating the FER in a short period, the frame quality information is collected in the certain period; the average of the information and the SER/FER translation table 40*c* are produced; and the FER is estimated. The estimated FER is compared with the target FER; if the target FER is smaller than the estimated value, the target receive power value is updated to a lower value on the inner loop; and if the estimated value is high, the target receive power value is updated to a higher value.

(Y2) In order to estimate a small FER estimated value such as 0.1% in a short period in (Y1), the frame quality information and the actual FERrel's are collected for a long period to produce the SER/FER translation table 40*c* independently from the outer loop control; and there is produced an average value distribution of the frame quality information for the respective FER's. Consequently, there is produced a translation table between the frame quality information and the FER based on the calculated average value distribution.

(Y3) As described above, it is possible to estimate the FER at a precision of FER=0.1% in a short measuring period.

(Y4) By periodically producing the SER/FER translation table 40*c* in (Y2), it is possible to automatically update the SER/FER translation table 40*c* if the transmission environment changes. In a cell environment where the transmission environment changes according to the time zone, the SER/FER translation table 40*c* can be automatically updated according to the change in the transmission environment for the respective cells; and it is possible to properly distribute the power for the respective time zones.

(7-4) Data Processing Method for Producing SER/FER Translation Table 40*c*

A description will be given of a detailed data processing method by means of the SER/FER translation table 40*c* with reference to FIG. 9 to FIG. 13.

With reference to the measurement result of the average SERav's shown in FIG. 9, the average SERav and FERrel are recorded respectively for 100 of the FER measuring segments 1 to 100. If the one FER measuring segment shown in FIG. 9 includes 200 of symbols, for example, the measurement is consequently carried out for the total of 20000 of symbols. Within the FER measuring segment 1, the average SERav is 10 and the FERrel of the FER measuring segment 1 is 1.0(%).

The SER collecting section 40*b* then produces average value distributions described below based on the FER measuring segment identifications and the average SERav within the FER measuring segment corresponding to the FER measuring segment identifications respectively for the plural different FER's, and acquires the average SERav's based on the average value distributions.

Note that the number of the FER measuring segments, and the number of the symbols per FER measuring segment are not limited to these numbers, but vary according to the modulation method and the variation of the data rate; and the data corresponding to the average SERav may be output as "rate" instead of "number".

Although the precisions of these data may increase if the sample number increases in an experiment or simulation, the measuring segment becomes longer accordingly; and it is thus difficult to acquire information quickly following the travel of the MS. The data precisions and the update frequency of the transmission environment are thus mutually complementary.

(7-5) Data Rearrangement Processing

FIG. 10 is a table showing a result of rearrangement of the data used for the average value distributions according to the embodiment of the present invention, and shows the relationship between the measured value X of the FERrel, the FER measuring segment identification Y from which the measured value X is acquired, and the average SERav's for the FER measuring segments included in the Y. For the FERrel of 1(%), the FER measuring segment identifications corresponding to the calculation result of 1(%) include 1, 3, 5, 11, 12, 15, 16, 19, 20, 21, . . . , 99. The average SERav's for these FER measuring segment identifications are respectively 10, 20, 10, . . .

(7-6) Acquisition of Average Values

Figure 11:
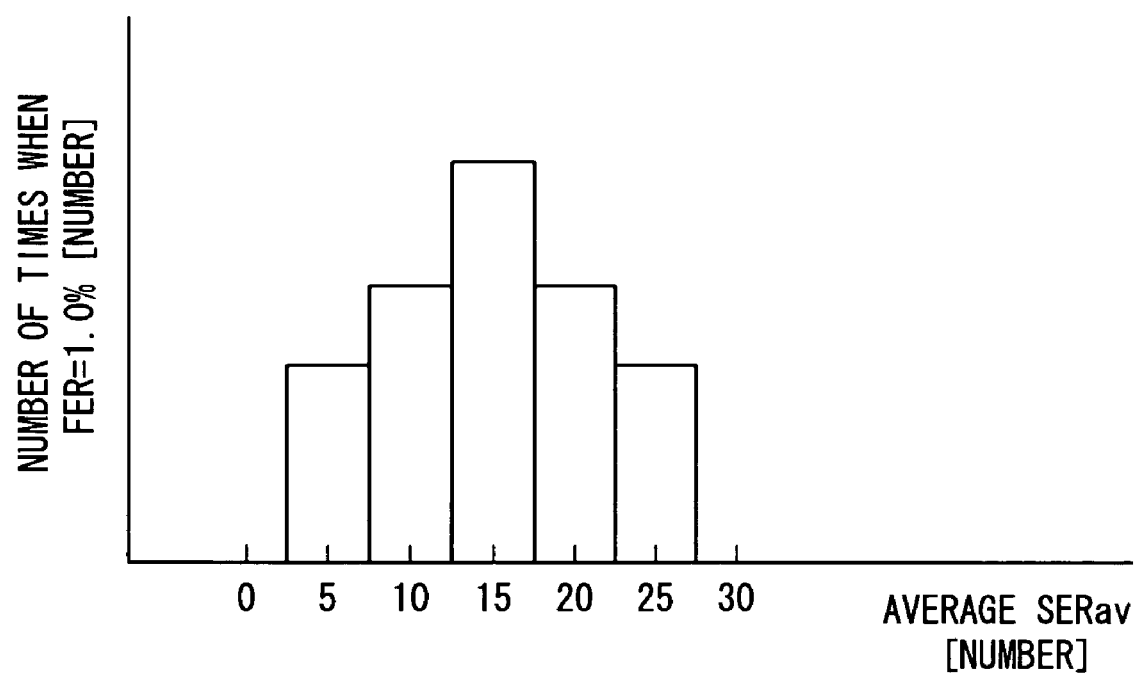
FIG. 11 is a distribution chart of the average SERav's according to the embodiment of the present invention.

FIG. 11 is a distribution diagram of the average SERav according to the embodiment of the present invention. The horizontal axis shown in FIG. 11 represents the average SERav (number) and the vertical axis represents the frequency or number of times (number) corresponding to the average SERav. There is carried out plotting for 5, 10, 15, 20, 25, and 30 (number) included in Z if the FERrel shown in FIG. 10 is 1.0%, for example. The SER collecting section 40*b* then determines that the average SERav is 15 (number) for the FERrel of 1.0% based on the distribution shown in FIG. 11. Note that FIG. 12(*b*) shows a smoothed distribution diagram of the average SERav shown in FIG. 11.

Figure 12A:
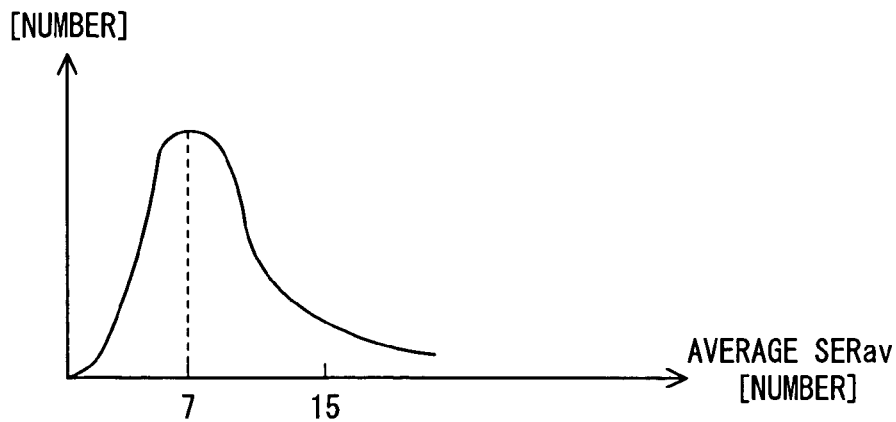
FIG. 12(a) is a distribution chart when FERrel is 0.5%.
Figure 12B:
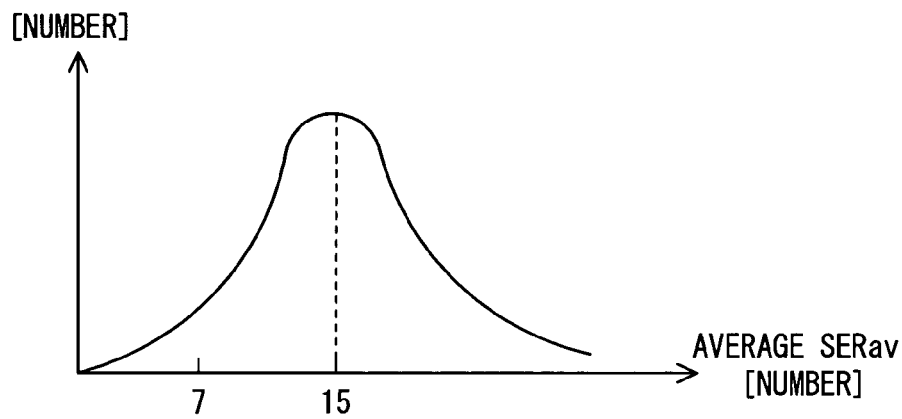
FIG. 12(b) is a chart obtained by smoothing the distribution chart of the average SERav's.
Figure 12C:
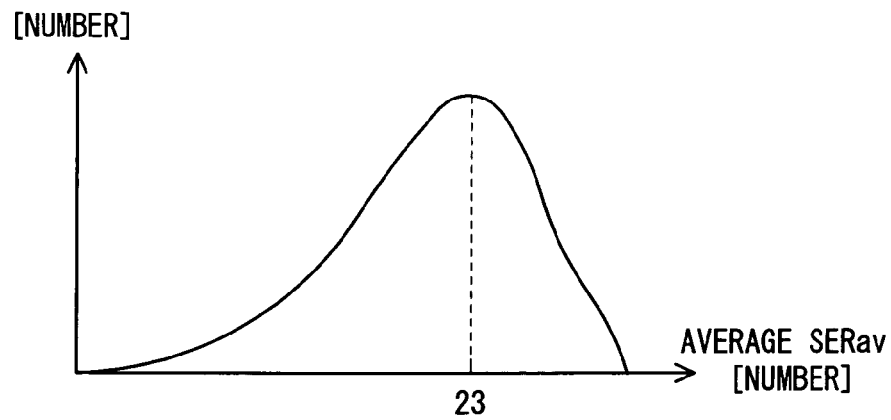
FIG. 12(c) is a distribution chart when FERrel is 2.0%.

Similarly, for the respective cases such as the FERrel of 0.5% and FERrel of 2.0%, distributions shown in FIG. 12(*a*) and FIG. 12(*c*) are obtained in the same manner, for example. Namely, the SER collecting section 40*b* acquires the average SERav respectively for the plural different FER's measured by the FER measuring section 40*a* based on the average value distribution for the 100 of SER's. It is determined that the average SERav's for the respective cases, FERrel of 0.5%, 1.0%, and 1.5%, are respectively 7, 15, and 23 by acquiring the average values for the respective distribution shapes shown in FIG. 12(*a*) to FIG. 12(*c*).

In this way, while measured FERrel values for respective connected calls are centered around the target FER, the FERrel values obtained in the process of producing the distributions are distributed around the target FER.

The SER/FER translation table 40c then summarizes the average SERav's for the respective FERrel's, thereby producing SER/FER translation lines (SER/FER regression lines).

(7-7) SER/FER Translation Lines

Figure 13:
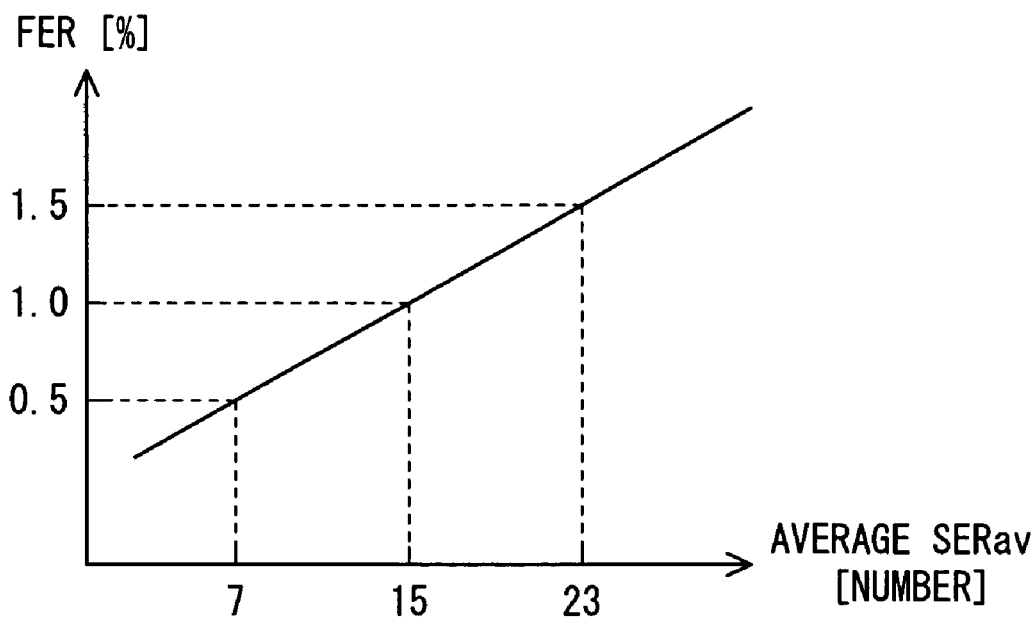
FIG. 13 is a chart describing an SER/FER translation line according to the embodiment of the present invention.

FIG. 13 is a diagram describing the SER/FER translation line according to the embodiment of the present invention. The SER/FER translation table 40c then acquires approximated SER/FER translation lines by plotting the average SERav's (number) and the FERrel's (%) of 0.5 to 1.5%, which are associated with each other. As a result, the average SERav and the measured FERrel are mutually translated to each other, and the target FER is estimated from the average SERav when necessary, which is applicable to the fast data processing.

According to prior art, the BSC cannot update the FER recorded previously until the reception of the entire one FER measuring segment and then the calculation of the FER are completed. On the other hand, the present invention utilizes the fact that the period required for calculating the SER, on which the average SERav is based, is shorter than the calculation period required for updating the FER; and thus, it is possible to carry out the SER/FER translation during the reception of one frame in an extreme case.

Further, it is only necessary for the SER/FER translation table 40c to include information adjacent to the FER's actually used; and it is possible to produce the SER/FER translation table 40c by means of estimated lines such as interpolation and extrapolation based on the acquired information for values adjacent to FER's which are not used.

The power control method according to the present invention is thus configured such that the BTS uses the symbol error number such as 100 of the SER's or the FER (ratio) due to the symbol error number. The BTS first measures the FER's and plural symbol error numbers, acquires the FER measuring segment identifications for which the plural different measured FER's are respectively acquired, acquires the plural second average symbol error numbers based on the distributions represented by the occurrence numbers of the plural average symbol error numbers respectively for the plural acquired FER measuring segment identifications, and then produces the SER/FER translation table 40c which associates the measured FER's and the second average symbol error numbers.

In this way, according to the outer loop control method used on the mobile communication system 100, the BTS and BSC on the receiving side collect the frame quality information and the FER by means of the statistical information, produces the average value distributions based on the collected information, and produces the SER/FER translation table 40c from the average value distributions. The SER/FER translation table 40c is produced for the states of the transmission environment which varies from one cell to another.

Consequently, it is possible to acquire the FER estimated value in a short period, and to update the target receive power value for the inner loop control by means of the FER with a high precision.

Note that the production of the table may be carried out in other variations.

(8) Variation for Increasing FER Precision

The transmission power control apparatus 1 (refer to FIG. 2) carries out the measurement for a long period, and thus the transmission environment fluctuates in a short period, resulting in errors in the data elements used for producing the distribution diagrams. The SER may be determined considering the standard deviation or variance value of the normal distribution or a probability density function (PDF's) other then the normal distribution.

Figure 14:
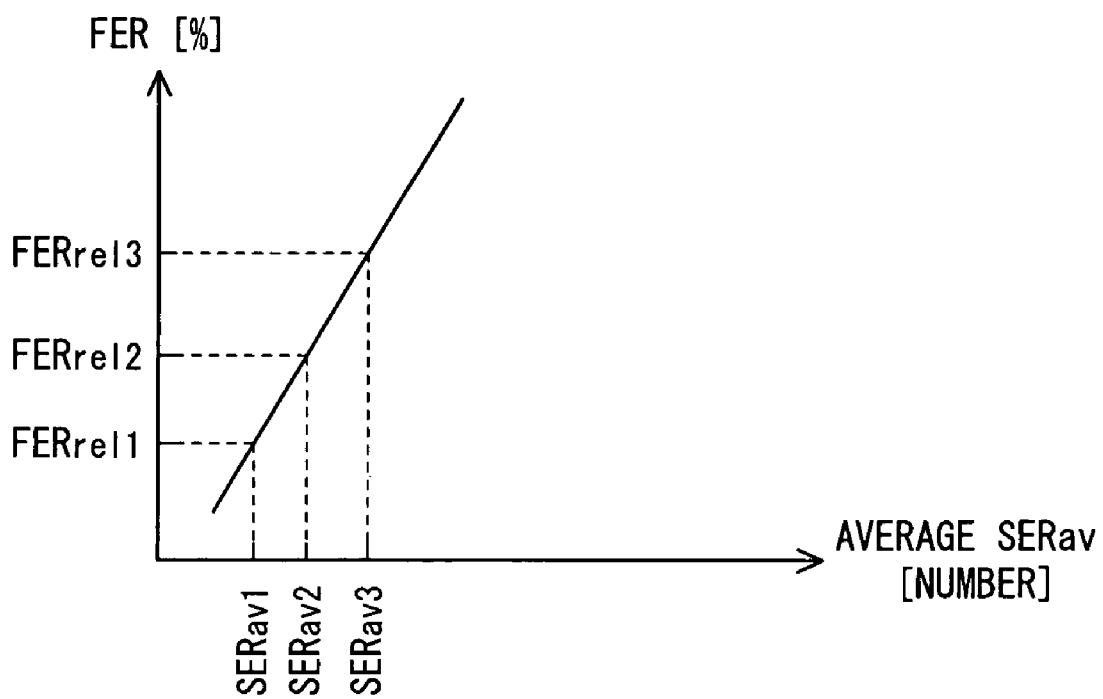
FIG. 14 is a chart describing an SER/FER translation line according to a variation of the present invention.

FIG. 14 is a diagram describing an SER/FER translation line according to a variation of the present invention. The precision of the SER/FER translation table 40c can be increased by a fine summation with a step of 0.1% across the range from FERrel1 to FERrel 3 of the vertical axis shown in FIG. 14.

The SER/FER translation can thus be fastly carried out, and simultaneously precise data can be acquired. In this way, the BTS can use the data obtained by the calculation to produce the SER/FER translation table 40c, thereby carrying out the outer loop control fast.

(9) Variation for Outer Loop Control During Handoff (9-1) Hard Handoff and Soft Handoff A description will now be given of the outer loop control during a handoff. The handoff is a function which changes a BTS to which a MS is connected (referred to as a BTS of a source of a handover [Source BTS]) to another BTS (referred to as a BTS of a destination of the handover [Target BTS]) while the MS is traveling. The MS can maintain the call to the neighboring BTS of the destination of the handover by means of the handoff if the MS is away from the BTS of the source of the handover.

A soft handoff implies that the BSC does not disconnect the wireless link between the MS and the BTS of the source of a handover, causes the BTS of the destination of the handover to transmit the same data, thereby causing the MS to temporarily communicate both with the BTS of the source of the handover and BTS of the destination of the handover, and then disconnecting the wireless link to the BTS of the source of the handover if the MS moves within a support area of the BTS of the destination of the handover, and enables a rare call disconnection, thereby securing a call with a high quality. As an example of the soft handoff, in the mobile communication system 100, if the MS travels close to a border of a cell supported by the BTS, the MS receives the same wireless signals simultaneously from the BTS with which the MS is communicating, and a BTS other than the BTS with which the MS is communicating, and selects and combines these wireless signals for respective frames, thereby carrying out the handover while maintaining a high quality.

(9-2) Configuration of Mobile Communication System

Figure 15:
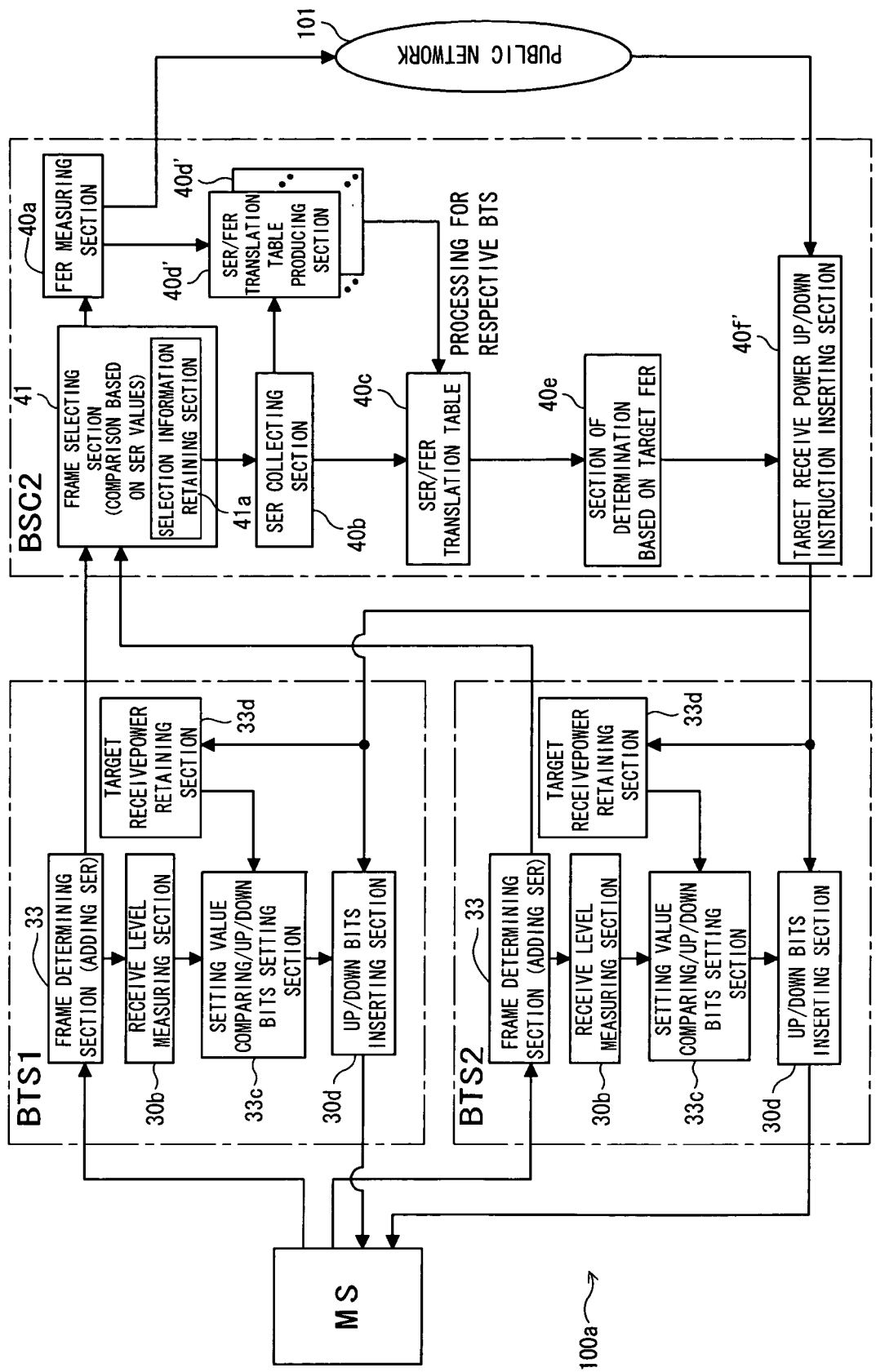
FIG. 15 is a configuration diagram of a mobile communication system according to a variation of the present invention.

FIG. 15 is a configuration diagram of a mobile communication system according to a variation of the present invention, and the mobile communication system 100a shown in FIG. 15 includes a BTS1 as a source of handover, a BTS 2 as a destination of the handover, and a 2nd BSC (second BSC: BSC2) which is a higher level apparatus thereof. Note that the other components are the same as the components described above or provide similar functions to those of the components described above.

The MS shown in FIG. 15 is present in a cell within a service area of the BTS1 and is communicating with the BTS1. The MS is traveling to a cell within the service area of the BTS2.

On this occasion, if the 2nd BSC detects that receive data from the BTS1 or BTS2 is being transmitted by the MS during a handoff, the 2nd BSC can write the receive data to the FER measuring section 40a and the SER collecting section 40b. The 2nd BSC is constituted by a frame selecting section 41, an SER/FER translation table producing section 40*d*', a SER/FER translation table 40*c*', and an up/down instruction information inserting section (target receive power up/down instruction information inserting section) 40*f*'. Moreover, the FER measuring section 40*a*, the SER collecting section 40*b*, the SER/FER translation table 40*c*', the comparing/determining section 40*e*, and the up/down instruction information inserting section 40*f*' shown in FIG. 15 cooperate to serve as a transmission power control apparatus 1'.

The frame selecting section 41 is provided on the front most stage of the 2nd BSC, outputs demodulated data to the public network 101, compares the respective SER's of the frames transmitted respectively from the BTS1 and BTS2 at the same time, selects the frame with a smaller SER value (a higher quality), and inputs the selected frame to the FER measuring section 40*a* and the SER collecting section 40*b*.

Moreover, the frame selecting section 41 includes a retaining section (selection information retaining section) 41*a* used for storing information on whether the selected BTS is the BTS1 or BTS2 if the frame selecting section 41 selects a frame. The retaining section 41*a* retains the MS and a code assigned to the MS, for example, which are associated with each other.

The SER/FER translation table producing section 40*d*' is provided on the output side of the FER measuring section 40*a* and SER collecting section 40*b*, has the same functions as those of the SER/FER translation table producing section 40*d*, and also has a function of recording the SER's and FER's respectively for the plural BTS's including the BTS1 and BTS2. The SER/FER translation table 40*c*' is provided for plural cells whose transmission environments are different from each other, and is updated independently for the respective plural cells. The SER/FER translation table 40*c*' may be configured such that the FER's and the average SERav's are updated according to the time zone, and this configuration can provide the proper FER according to the transmission environment.

The up/down instruction information inserting section 40*f*' receives the call data transmitted from the public network 101 to the BTS1 and BTS2, and inserts the predetermined command to a frame to be transmitted to the MS. Then, the comparing/determining section 40*e* and the up/down instruction information inserting section 40*f*' cooperate to serve as a transmission power control section (40*e*, 40*f*'), estimate the estimated FER corresponding to the SER acquired by the FER measuring section 40*a* from the SER/FER translation table 40*c*', and control the transmission power based on the estimated FER and the target FER stored in advance.

Consequently, the 2ndBSC receive the demodulated data from the BTS1 and BTS2 through forward wired lines. The 2ndBSC outputs call data to the BTS1 or BTS2 to which the MS belongs based on position registration data of the MS itself transmitted from the MS in advance for a call generated on the public network 101.

(9-3) Description of Operation

Figure 16:
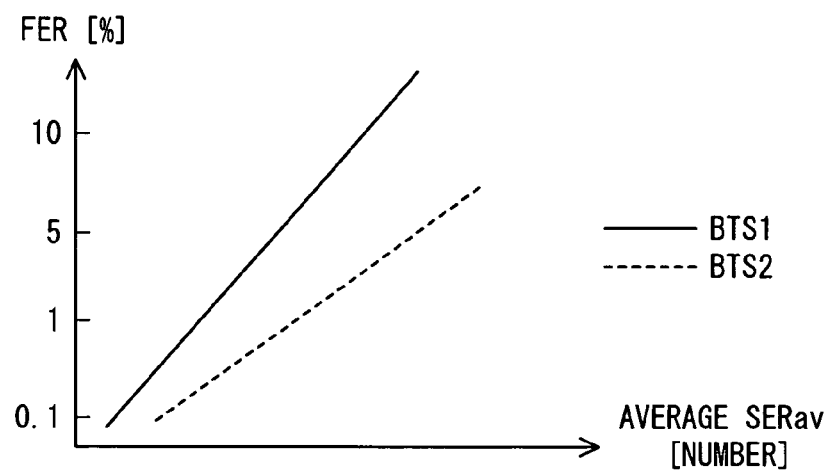
FIG. 16 is a chart showing an example of the SER/FER translation table according to the variation of the present invention.

A description will be given of the outer loop control if a soft handoff occurs between the BTS1 and BTS2 in the state where the respective SER/FER translation tables 40*c*' are provided for the BTS1 and BTS2 according to this configuration. In the following description, the BTS1 and BTS2 are respectively a handover source and a handover destination. In addition, the contents of the SER/FER translation tables 40*c*' of the BTS1 and BTS2 are respectively represented as two lines shown in FIG. 16, for example. Note that the solid line corresponds to the BTS1, and the dotted line corresponds to the BTS2.

It is assumed that if the MS is connected for a call only to the BTS1 at first, the 2ndBSC refers to a part of the SER/FER translation tables 40*c*' corresponding to the BTS1, thereby estimating the FER. In this state, if the BTS2 is added for the soft handoff due to a travel of the MS, the 2ndBSC obtains different SER information and CRC determination results (CRCOK/CRCNG) from the BTS1 and BTS2.

(W1) The frame selecting section 41 compares the SER information of two frames transmitted from the BTS1 and BTS2, selects a frame having a better quality (a smaller SER value), and stores information on whether the selected frame is transmitted by the BTS1 or BTS2.

(W2) The transmission power control section (40*e*, 40*f*') of the 2nd BSC selects and uses the SER/FER translation table 40*c*' for the FER estimation. When the mobile station is carrying out a soft handoff between plural cells for which different SER/FER translation tables 40*c*' are provided, the transmission power control section (40*e*, 40*f*') estimates an estimated FER for the soft handoff according to the qualities in the plural cells, and specifically, the frame selecting section 41 determines that the frame of the BTS1 is better, and recognizes that the BTS1 receives many better frames, resulting in selecting the BTS1, for example. The SER collecting section 40*b* then uses only frames from the BTS1, which have been determined better, in order to calculate the average SERav, and uses the SER/FER translation table 40*c*' for the BTS1 to estimate the FER. This is because the state of the one path is better than the state of the other path in terms of the transmission environment; and it is better to follow the SER/FER translation table 40*c*' on the BTS1 for which the better path is obtained.

(W3) If the numbers of the selected frames are approximately the same, the BTS1 and BTS2 are approximately equal in terms of the quality state, and are in states in which a handoff gain is easily obtained. The SER/FER translation is carried out respectively for the BTS1 and BTS2, if both the translations result in the transmission power up, the up instruction is given; and if both the translations result in the transmission power down, the down instruction is given. If the results are different from each other in terms of the up and down, the present state is maintained (or either the up or down instruction is given).

(W4) Then, the MS measures the receive SIR, transmits the TPC information based on the measurement result to the BTS1, and the BTS1 increases/decreases the transmission power based on the TPC information.

In more detail, the MS applies the CRC determination to the received frame, and measures the receive power value which provides the error rate, which is based on the CRC determination, and is lower than a target value. The MS then determines the measured receive power value as the target receive power value, compares the measured receive power value and the target receive power value at a fixed cycle such as 666 (μsec) or 1.25 milliseconds (msec), and transmits the result to the BTS1.

(W5) To practice this measurement method, it is preferable to measure the receive power value within a predetermined optimal period or less. FIG. 15 shows the outer loop control during the soft handover.

(10) Specific Example of Production of SER/FER Translation Table 40*c*'

(10-1) Configuration of SER/FER Translation Processing System

Figure 17:
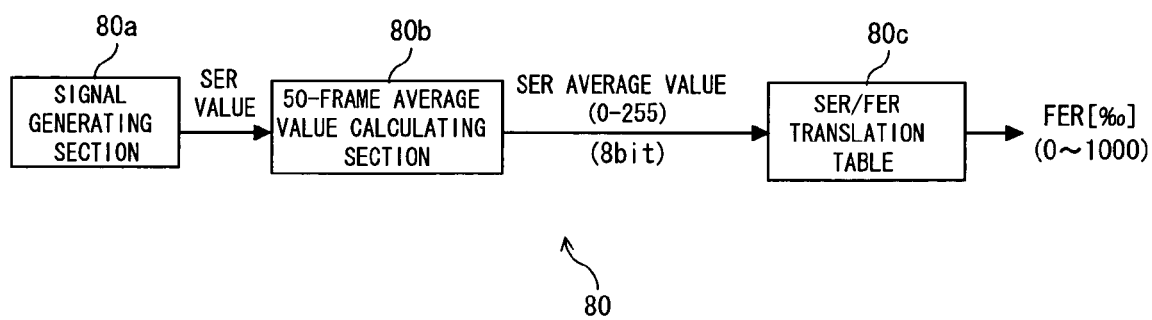
FIG. 17 is a configuration diagram of an SER/FER translation processing system according to the embodiment of the present invention.

FIG. 17 is a configuration diagram of an SER/FER translation processing system according to the embodiment of the present invention. The SER/FER translation processing system 80 shown in FIG. 17 is used to prove and study the SER/FER translation, and is constituted by an SER generating apparatus (signal generating section) 80*a*, an average value calculating section (50-frame average calculating section) 80*b*, an SER/FER translation table 80*c*.

The SER generating apparatus 80*a* is a signal processing apparatus which can successively output a desired SER value, the average value calculating section 80*b* averages the SER values, which are input successively, thereby calculating the average SERav for 50 frames, and outputs the calculated average SERav as an eight-bit data, and the SER/FER translation table 80*c* inputs the eight-bit average SERav, and outputs the FER.

Note that the above embodiment is not limited to the following numerical values and the like.

(10-2) Estimation of SER Standard Deviation (σ)

Figure 18:
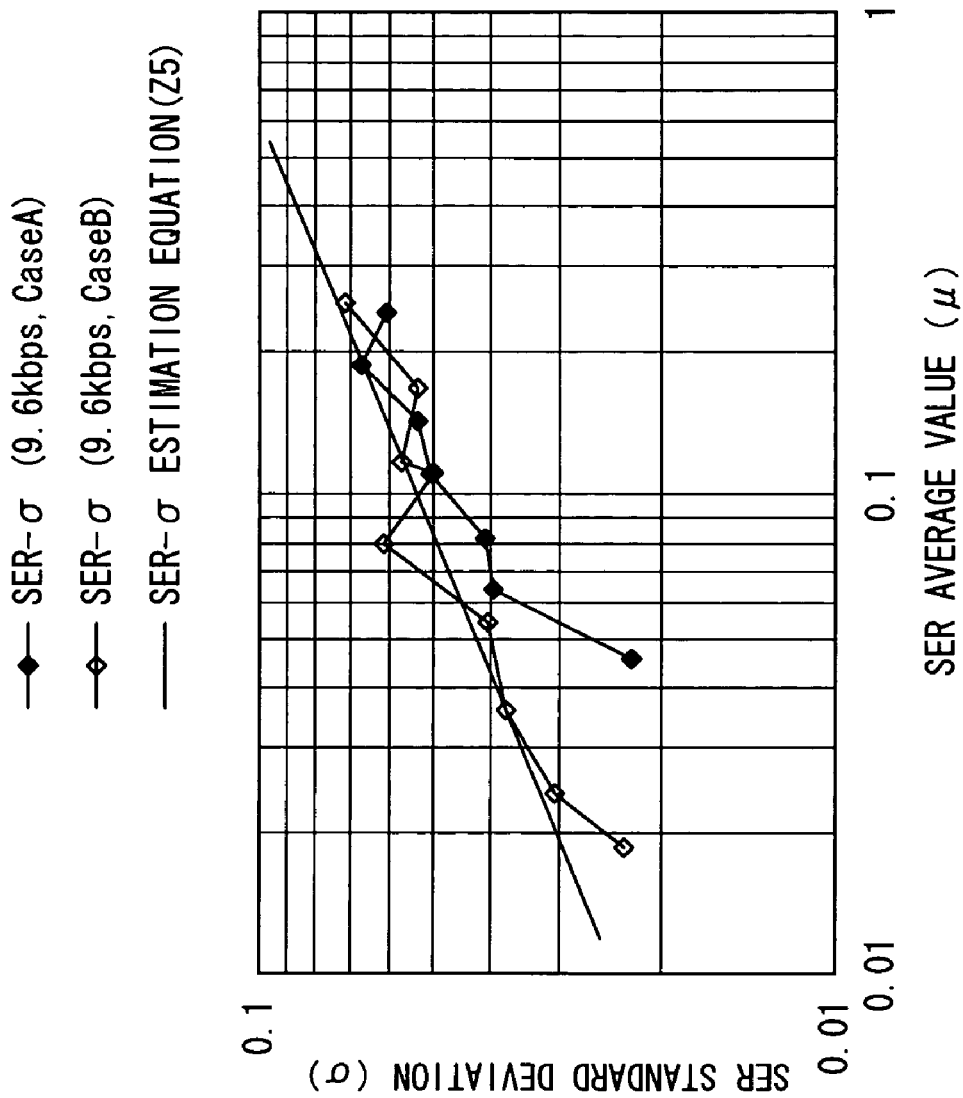
FIG. 18 is a chart showing a characteristic of SER-μ against SER-σ according to the embodiment of the present invention.
Figure 20:
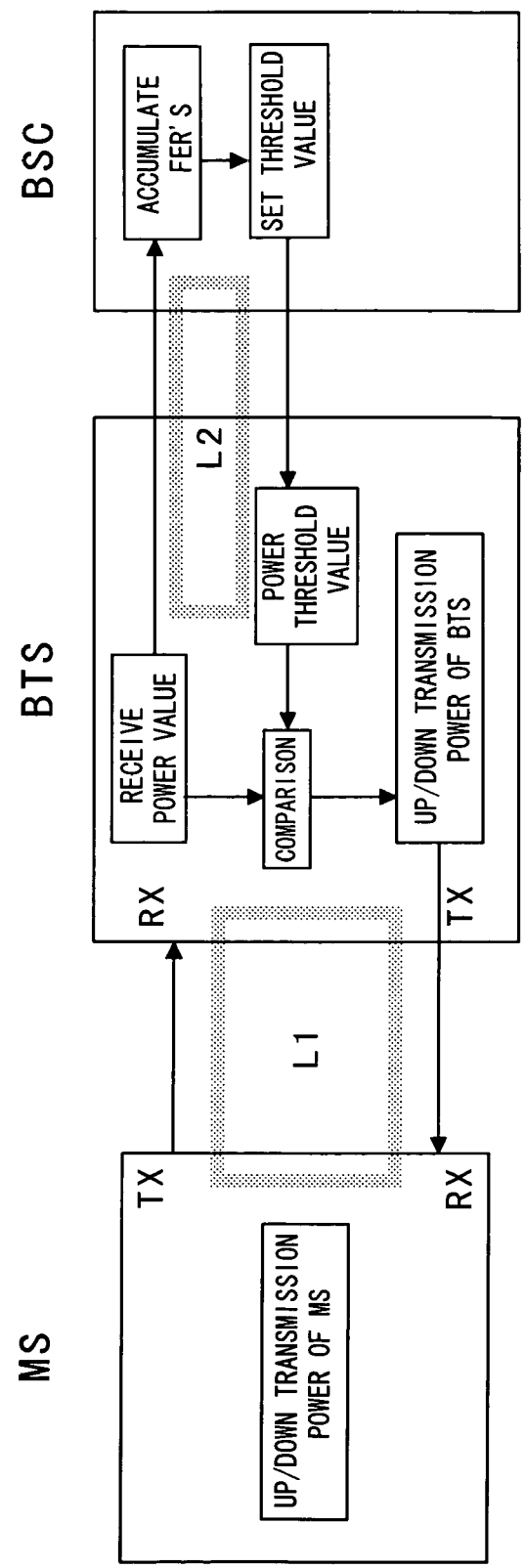
FIG. 20 is a diagram describing inner loop control and outer loop control.

SER-σ is estimated for the SER. FIG. 18 shows respectively the SER average values (μ), measured results of the SER standard deviations (σ), and a result of calculation based on these values and measured results using the following estimation equation (Z5).

$$ln(SER\text{-}\sigma)=0.350\times(ln(SER\text{-}\mu)+1.38)-2.60 \qquad (Z5)$$

In the above equation, ln(x) represents a natural logarithm, and ln(SER-α) corresponds to the SER standard deviation (σ).

(10-3) Example of SER/FER Translation Table 40*c* (40*c'*)

FIG. 19(*a*) and FIG. 19(*b*) respectively show a first example and a second example of the SER/FER translation table 40*c* (40*c'*) according to the embodiment of the present invention, values shown in FIG. 19(*a*) are measured values, and those shown in FIG. 19(*b*) are values obtained by measuring the symbol error numbers. Note that Eb/N0 represents an energy per information bit, and indicates that there is considered an AWGN (Additive White Gaussian Noise: white Gaussian noise which can be linearly added) whose two-sided power spectral density is N0.

According to the power control method of the present invention, the MS can avoid interference by the transmission powers of other MS's, and can maintain a high transmission quality in this way.

The method operates such that the receive signal intensity is constant on all the moving bodies independently of the distance, topographies, noise sources, and the like. In addition, the update cycle is short, and it is possible to maintain the resolution of the data signal for the power control to a relatively high level.

(B) Others

The present invention is not limited to the above embodiment and the variations thereof, and can be embodied as variations without departing from the purpose of the present invention.

The table which translates the wireless frame quality information to the FER in order to estimate the FER may be provided on the BTS apparatus. For example, for the down link (W-CDMA) power control or forward link (cdma2000) power control, the MS or BTS (BTS1, BTS2) may have the respective functions described above, thereby practicing the power control on the down link or forward link.

INDUSTRIAL APPLICABILITY

As detailed above, according to the transmission power control apparatus, mobile communication system, and power control method of the present invention, the frame error rates are collected in a certain segment, the average value distributions are generate; the SER/FER translation table is produced based on the distributions; and a highly precise frame error rate is acquired in a short measuring period. The mobile station thus can estimate the highly precise frame error rate in the short period for the outer loop control and inner loop control, thereby following a short term fluctuation on the wireless link; and the base transceiver station can quickly measure the frame error rate, which serves as an index of the update of the target receive power value. By setting the FER value low, and shortening the update cycle of the target receive power value, it is possible to reduce the retransmission number, resulting in increase of the throughput. Further, a high communication quality is maintained; high speed data communication is enabled; and the handoff is smoothly carried out by the outer loop control.

The invention claimed is:

1. A transmission power control apparatus characterized by comprising:
    a measuring section that measures a frame error rate within a predetermined segment,
    an acquiring section that acquires average frame quality information acquired by averaging plural pieces of quality information per frame based on statistical information of the plural pieces of quality information per frame,
    a translation table that stores the frame error rate measured by said measuring section and the average frame quality information acquired by said acquiring section, wherein the frame error rate and the average frame quality information are associated with each other, and
    a transmission power control section that estimates an estimated frame error rate corresponding to the quality information per frame acquired by said acquiring section from said translation table, and controls a target receive power threshold based on the estimated frame error rate and a target frame error rate stored, thereby controlling a transmission power of an opponent communication apparatus.

2. The transmission power control apparatus according to claim 1, wherein:
    said acquiring section is configured to acquire the average frame quality information based on an average value distribution of the plural pieces of quality information per frame respectively for the plural different frame error rates measured by said measuring section.

3. The transmission power control apparatus according to claim 2, wherein:
    said acquiring section is configured to produce the average value distribution based on numbers of the frame error rate measuring segments from which the frame error rate is acquired and average values of the quality information per frame within the frame error rate measuring segments, and acquires the average frame quality information based on the average value distribution, respectively for the plural different frame error rates.

4. The transmission power control apparatus according to claim 1, wherein:
    said translation table is configured to be provided respectively for plural cells, which are different in transmission environment, and so as to be updated independently for the plural cells.

5. The transmission power control apparatus according to claim 1, wherein:
    said translation table is configured so that the frame error rate and the average frame quality information are updated according to the time zone.

6. The transmission power control apparatus according to claim 1, wherein:
if a mobile station MS is carrying out a soft handoff between plural cells for which said different translation tables are provided, said transmission power control section is configured to estimate the estimated frame error rates during the soft handoff according to the qualities in the plural cells.

7. The transmission power control apparatus according to claim 1, wherein:
said measuring section is configured to measure the number of errors of symbols whose symbol length is shorter than the frame length.

8. A mobile communication system comprising a mobile station that is capable of controlling a transmission power, a base transceiver station that carries out the transmission power control for said mobile station based on data from said mobile station and a frame error rate stored in advance, and a transmission power control apparatus that can update the frame error rate of said base transceiver station BTS based on a frame error rate within a predetermined segment and plural pieces of quality information per frame on plural frames included in the predetermined segment, the system comprising:
said transmission power control apparatus comprises:
a measuring section that measures the frame error rate within the predetermined segment,
an acquiring section that acquires average frame quality information acquired by averaging the plural pieces of quality information per frame based on statistical information of the plural pieces of quality information per frame,
a translation table that stores the frame error rate measured by said measuring section and the average frame quality information acquired by said acquiring section, wherein the frame error rate and the average frame quality information are associated with each other, and
a transmission power control section that estimates an estimated frame error rate corresponding to the quality information per frame acquired by said acquiring section from said translation table, and controls a target receive power threshold based on the estimated frame error rate and a target frame error rate stored, thereby controlling a transmission power of an opponent communication apparatus.

9. A power control method in a mobile communication system comprising a mobile station that is capable of controlling a transmission power, a base transceiver station that carries out the transmission power control for the mobile station based on data from the mobile station MS and a frame error rate stored, and a transmission power control apparatus that can update the frame error rate of the base transceiver station BTS based on a frame error rate within a predetermined segment and plural pieces of quality information per frame on plural frames included in the predetermined segment, the method characterized by comprising steps of:
measuring the frame error rate within the predetermined segment,
averaging the plural pieces of quality information per frame,
producing a translation table that stores the frame error rate measured by said measuring and the average frame quality information acquired by said averaging, wherein the frame error rate and the average frame quality information are associated with each other,
estimating an estimated frame error rate corresponding to the quality information per frame from the translation table, and
controlling the transmission power based on the estimated frame error rate and a target frame error rate stored.

10. The power control method according to claim 9, wherein:
said transmission power control updates a target receive power value to a lower value if the estimated frame error rate is lower than the target frame error rate, and updates the target receive power value to a higher value if the estimated frame error rate is higher than the target frame error rate.

11. The power control method according to claim 9, wherein:
the base transceiver station BTS is configured to use at least either a symbol error number or a ratio derived from the symbol error number as the plural pieces of quality information per frame;
the base transceiver station BTS measures the frame error rate and the plural numbers of the symbol errors;
the base transceiver station BTS acquires frame error rate measuring segment identification from which the plural different measured frame error rates are acquired;
the base transceiver station BTS acquires plural second average symbol error numbers based on distributions represented by the number of occurrences of the plural average symbol error numbers respectively for the plural acquired frame error rate measuring segment numbers; and
the base transceiver station BTS produces a translation table which associates the frame error rate acquired by said measuring and the second average symbol error number with each other.

12. The power control method according to claim 11, wherein the base transceiver station BTS uses symbol error numbers for symbols having the symbol length shorter than the frame length as the plural pieces of quality information per frame.

* * * * *